United States Patent
Tsukamoto et al.

(10) Patent No.: US 10,337,570 B2
(45) Date of Patent: Jul. 2, 2019

(54) TRANSAXLE INCLUDING BI-DIRECTIONAL OVERRUNNING CLUTCH

(71) Applicant: KANZAKI KOKYUKOKI MFG. CO., LTD., Amagasaki-shi, Hyogo (JP)

(72) Inventors: Michio Tsukamoto, Morristown, TN (US); Hideaki Shokita, Amagasaki (JP); Etsuo Miyake, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 4 days.

(21) Appl. No.: 15/293,701

(22) Filed: Oct. 14, 2016

(65) Prior Publication Data
US 2017/0108059 A1 Apr. 20, 2017

Related U.S. Application Data

(60) Provisional application No. 62/242,551, filed on Oct. 16, 2015.

(51) Int. Cl.
| | |
|---|---|
| F16D 41/10 | (2006.01) |
| F16D 47/04 | (2006.01) |
| F16D 41/067 | (2006.01) |
| F16D 43/04 | (2006.01) |
| F16D 41/08 | (2006.01) |
| B60K 17/02 | (2006.01) |

(Continued)

(52) U.S. Cl.
CPC ......... *F16D 41/105* (2013.01); *F16D 41/067* (2013.01); *F16D 41/088* (2013.01); *F16D 43/04* (2013.01); *F16D 47/04* (2013.01); *B60K 17/02* (2013.01); *B60K 17/3505* (2013.01); *F16D 2041/0605* (2013.01)

(58) Field of Classification Search
None
See application file for complete search history.

(56) References Cited

U.S. PATENT DOCUMENTS 6,622,837 B2 * 9/2003 Ochab ............... B60K 17/3515
192/35
8,857,294 B2 10/2014 Brewer et al.
(Continued)

FOREIGN PATENT DOCUMENTS
EP 1338816 * 8/2003

*Primary Examiner* — Mark A Manley
(74) *Attorney, Agent, or Firm* — Cantor Colburn LLP

(57) ABSTRACT

A transaxle includes a transaxle casing, a bi-directional overrunning clutch in the transaxle casing, a friction mechanism, and a clutch-off biasing mechanism. The bi-directional overrunning clutch includes coaxial input and output members journalled by the transaxle casing, and includes a cage disposed between the input member and the output member. Rollers carried by the cage are rotatable to follow rotation of the output member. The cage is rotatable relative to the input member according to the rotation of the rollers following the output member until the rollers contact the input member to engage the bi-directional overrunning clutch. The friction mechanism applies a friction resistance to the cage to rotate the cage relative to the input member. The clutch-off biasing mechanism biases the cage to the initial position. The friction mechanism and the clutch-off biasing mechanism are distributed in the transaxle casing at first and second end portions of the cage.

3 Claims, 23 Drawing Sheets

(51) Int. Cl.
*F16D 41/06* (2006.01)
*B60K 17/35* (2006.01)

(56) References Cited

U.S. PATENT DOCUMENTS

2003/0000796 A1\* 1/2003 Kawai .................. F16D 41/067
 192/223.2
2015/0159743 A1\* 6/2015 Palmer ................. F16D 41/088
 74/650

\* cited by examiner

TRANSAXLE INCLUDING BI-DIRECTIONAL OVERRUNNING CLUTCH

CROSS-REFERENCE TO RELATED APPLICATIONS

This application claims the benefit of priority under 35 U.S.C. § 119(e) based on U.S. Provisional Application Ser. No. 62/242,551 filed on Oct. 16, 2015, the entire content of which is also incorporated herein by reference.

BACKGROUND

Field of the Invention

At least an embodiment of the present invention relates to a transaxle including a bi-directional overrunning clutch.

As disclosed by U.S. Pat. No. 8,857,294 B, there is a well-known four-wheel drive vehicle including main and auxiliary transaxles configured so that power is transmitted from the main (rear-wheel) transaxle to the auxiliary (front-wheel) transaxle. In the four-wheel drive vehicle, the auxiliary transaxle adopts a bi-directional overrunning clutch, and is provided with a clutch-engagement control unit for temporarily canceling the engagement of the bi-directional overrunning clutch. The clutch-engagement control unit includes an electrically controlled electromechanical device, such as a coil or a solenoid.

The bi-directional overrunning clutch also includes an armature plate. The armature plate includes a plurality of tabs. The armature plate is engaged to a roll cage via the tabs so that the armature plate rotates together with the roll cage. When the electromechanical device is energized, the armature plate is controlled in location so as to apply a dragging torque to the roll cage, thereby actuating the bi-directional overrunning clutch. Therefore, the bi-directional overrunning clutch is engaged to drive the auxiliary transaxle when a rotary speed of its driven side relative to its drive side reaches a predetermined rotary speed. Once the electromechanical device is unenergized, the dragging torque is no further applied to the roll cage, thereby inactivating the bi-directional overrunning clutch. Therefore, even if the rotary speed of the driven side relative to the drive side reaches the predetermined rotary speed, the bi-directional overrunning clutch is still disengaged, whereby rotation of the auxiliary transaxle is still free from the driving force.

Further, the clutch-engagement control unit includes a torsion spring biasing the roll cage to its neutral position so as to center rollers on a cam surface of a clutch housing. During engagement of the bi-directional overrunning clutch, when the roll cage rotates in any direction to rotate relative to the clutch housing, the torsion spring is deflected. The spring force of the torsion spring acts against the relative rotation of the clutch housing and the roll cage, so that, when a speed of the relative rotation becomes less than the predetermined rotary speed, the roll cage is forcibly restored to the initial neutral position. Due to such a construction, the engagement of the bi-directional overrunning clutch is quickly and smoothly canceled, thereby preventing the auxiliary transaxle from being still driven even while the electromechanical device is unenergized.

U.S. Pat. No. 8,857,294 B discloses another embodiment of a clutch-engagement control unit including an adapter connected to the torsion spring and the roll cage. The adapter serving as a spring retainer is attached along the clutch housing. A pin is provided on a side surface of the clutch housing.

The adapter includes projections outward from another side surface opposite the surface with the pin. The projections are engaged into slits formed in the armature plate when the armature plate is placed on the adapter. Due to the engagement of the armature plate to the adapter, the adapter is connected to the roll cage. In other words, similar to the above-mentioned embodiment, the roll cage is connected to the armature plate via tabs. The torsion spring is connected to the adapter via the pin. Similar to the above-mentioned embodiment, the torsion spring biases the roll cage to the neutral position.

However, in each of the embodiments, the clutch-engagement control unit is disposed adjacent to the armature plate and the electromechanical device. In other words, the clutch-engagement control unit including the torsion spring, the electromechanical device, and the armature plate are assembled eccentrically in one side of the transaxle including the bi-directional overrunning clutch. As a result, the clutch housing and the roll cage have respective end portions at the one side complicated in shape so as to complicate their assembling. Also, the complicatedly shaped end portions of the clutch housing and the roll cage at the one side may have cutout portions increased so as to reduce their strengths.

SUMMARY

At least an embodiment of the present application provides a transaxle including a bi-directional overrunning clutch prevented from being unexpectedly wedged-like engaged while ensuring its capacity of being capable of canceling its engagement quickly and smoothly. The transaxle is designed so that its assembling is not complicated, and a clutch housing and a cage have respective end portions from reduction of their strengths concentrated at one side thereof.

To achieve the above, a transaxle comprises a transaxle casing, a bi-directional overrunning clutch, a friction mechanism, and a clutch-off biasing mechanism. The bi-directional overrunning clutch is disposed in the transaxle casing. The bi-directional overrunning clutch includes an input member, an output member, a cylindrical cage, and a plurality of rollers. The input member is journalled by the transaxle casing. The output member is journalled by the transaxle casing and coaxially surrounded by the input member. The input member and the output member have an annular space between an inner circumferential surface of the input member and an outer circumferential surface of the output member. The inner circumferential surface of the input member includes a plurality of wedge portions aligned in the circumferential direction of the input member, and includes a plurality of radially expanded portions which are diametrically larger than the wedge portions. The cage is disposed coaxially to the input member and the output member in the annular space. The cage has first and second end portions opposite each other in the axial direction of the output member. The plurality of rollers are carried by the cage and contact the outer circumferential surface of the output member rotatably following rotation of the output member.

The bi-directional overrunning clutch is automatically shifted between its disengagement state where the rollers are disposed at the respective radially expanded portions of the input member and are separated from the respective wedge portions, and its engagement state where the rollers contact the respective wedge portions. The shift of the bi-directional overrunning clutch depends on change of rotary speed difference between the input member and the output member.

The friction mechanism applies a frictional force to the cage so as to enable the cage to rotate relative to the input member according to the rotation of the rollers following the output member. The clutch-off biasing mechanism biases the cage in a direction to disengage the bi-directional overrunning clutch. The friction mechanism and the clutch-off biasing mechanism are distributed so that the friction mechanism is disposed at the first end portion of the cage, and the clutch-off biasing mechanism is disposed at the second end portion of the cage.

Preferably, the clutch-off biasing mechanism includes a spring interposed between the input member and the cage so as to be elastically transformable according to the rotation of the cage relative to the input member, thereby biasing the cage to the initial rotational position relative to the input member.

Further preferably, the input member is provided with first and second engagement members that are rotatable integrally with the input member. The cage is provided with third and fourth engagement members that are rotatable integrally with the cage. The spring is a compression spring, including an elastic looped portion that is able to expand and contract in the radial direction thereof, and including first and second end portions extended in the same radial direction from the looped portion, the first and second end portions of the spring being disposed between the first and second engagement members and between the third and fourth engagement members. When the cage is disposed at its initial rotational position relative to the input member to disengage the bi-directional overrunning clutch, the third and fourth engagement members are aligned with the respective first and second engagement members on respective radial lines, when viewed in the axial direction of the input member and the cage, so that the first end portion of the spring is engaged to the first and third engagement portions, and the second end portion of the spring is engaged to the second and fourth engagement portions. During rotation of the cage relative to the input member from the initial rotational position until the bi-directional overrunning clutch is engaged, the third and fourth engagement members are offset from the first and second engagement members in the circumferential direction of the input member and the cage so that one of the first and second end potions of the spring is engaged to either the first or second engagement member, and the other of the first and second end portions of the spring is engaged to either the third or fourth engagement portion.

Further preferably, the cage is provided with a spring holder supporting the elastic looped portion of the spring between the first and second end portions of the spring. The spring holder includes the third and fourth engagement members. The spring holder is engaged to the second end portion of the cage rotatably integrally with the cage.

Alternatively, preferably, the input member is provided with first and second surfaces that are rotatable integrally with the input member. The cage is provided with third and fourth surfaces that are rotatable integrally with the cage. The spring is a torsion spring such that a pair of end portions of the spring are pulled to cross over each other and have the first, second, third and fourth surfaces therebetween. When the cage is disposed at its initial rotational position relative to the input member to disengage the bi-directional overrunning clutch, the third and fourth surfaces are aligned with the respective first and second surfaces on respective radial lines, when viewed in the axial direction of the input member and the cage, so that the first end portion of the spring contacts the first and third surfaces, and the second end portion of the spring contacts the second and fourth surfaces. During rotation of the cage relative to the input member from the initial rotational position until the bi-directional overrunning clutch is engaged, the third and fourth surfaces are offset from the first and second surfaces in the circumferential direction of the input member and the cage so that one of the first and second end potions of the spring is engaged to either the first or second surface, and the other of the first and second end portions of the spring is engaged to either the third or fourth surface.

Alternatively, preferably, the input member clutch housing is provided with a first engagement member that is rotatable integrally with the input member. The cage is provided with a second engagement member that is rotatable integrally with the cage. The spring is a torsion spring such that a pair of end portions of the spring are pulled to cross over each other and have both the first and second engagement members therebetween. When the cage is disposed at the initial rotational position relative to the input member to disengage the bi-directional overrunning clutch, the first and second engagement members are disposed on one radial line, when viewed in the axial direction of the input member and the cage, so as to engage to both of the end portions of the spring respectively. During rotation of the cage relative to the input member from the initial rotational position until the bi-directional overrunning clutch is engaged, the first and second engagement members are offset from each other in the circumferential direction of the input member and the cage so that first engagement member engages to one of the end portions of the spring, and the second engagement member engages to the other of the end portions of the spring.

Further preferably, the cage is provided with a spring holder supporting an elastic looped portion of the spring between the end portions of the spring. The spring holder includes the second engagement member. The spring holder is engaged to the second end portion of the cage rotatably integrally with the cage.

Alternatively, preferably, one end portion of the spring is engaged to the cage so as to be rotatable integrally with the cage. Another end portion of the spring is engaged to the input member so as to be rotatable integrally with the input member. An elastic portion of the spring between the end portions is disposed in a space between the cage and the input member so as to be allowed to elastically transform according to the rotation of the cage relative to the input member.

Alternatively, preferably, a pair of end portions of the spring are engaged to the input member rotatably integrally with the input member so as to have a constant gap therebetween. An intermediate portion of the spring is engaged to the cage rotatably integrally with the cage. The spring includes a pair of elastic portions between the respective end portions and the intermediate portion, such that the elastic portions of the spring are disposed in a space between the cage and the input member so as to be allowed to elastically transform according to the rotation of the cage relative to the input member.

Therefore, due to the distribution of the friction mechanism and the clutch-off biasing mechanism at the first and second end portions of the cage opposite each other in the axial direction of the output member, the transaxle is advantageous in simplifying each of the friction mechanism and the clutch-off biasing mechanism so as to reduce labors for assembling the transaxle, in comparison with the case where the friction mechanism and the clutch-off biasing mechanism are complicatedly assembled with each other and are concentrated at one end portion of the cage in the axial direction of the output member.

Further, due to the distribution of the friction mechanism and the clutch-off biasing mechanism at the first and second end portions of the cage opposite each other in the axial direction of the output member, the transaxle is advantageous in lightening respective portions of the transaxle around the first and second end portions of the cage in the transaxle casing so as to economically ensure durability of the transaxle, in comparison with a case where the friction mechanism and the clutch-off biasing mechanism are concentrated at one end portion of the cage in the axial direction of the output member so as to stress a portion of the transaxle at the side of the cage and so as to require costs for strengthening the portion of the transaxle to ensure required durability of the transaxle.

These and other features and advantages will appear more fully from the following detailed description of the invention with reference to attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
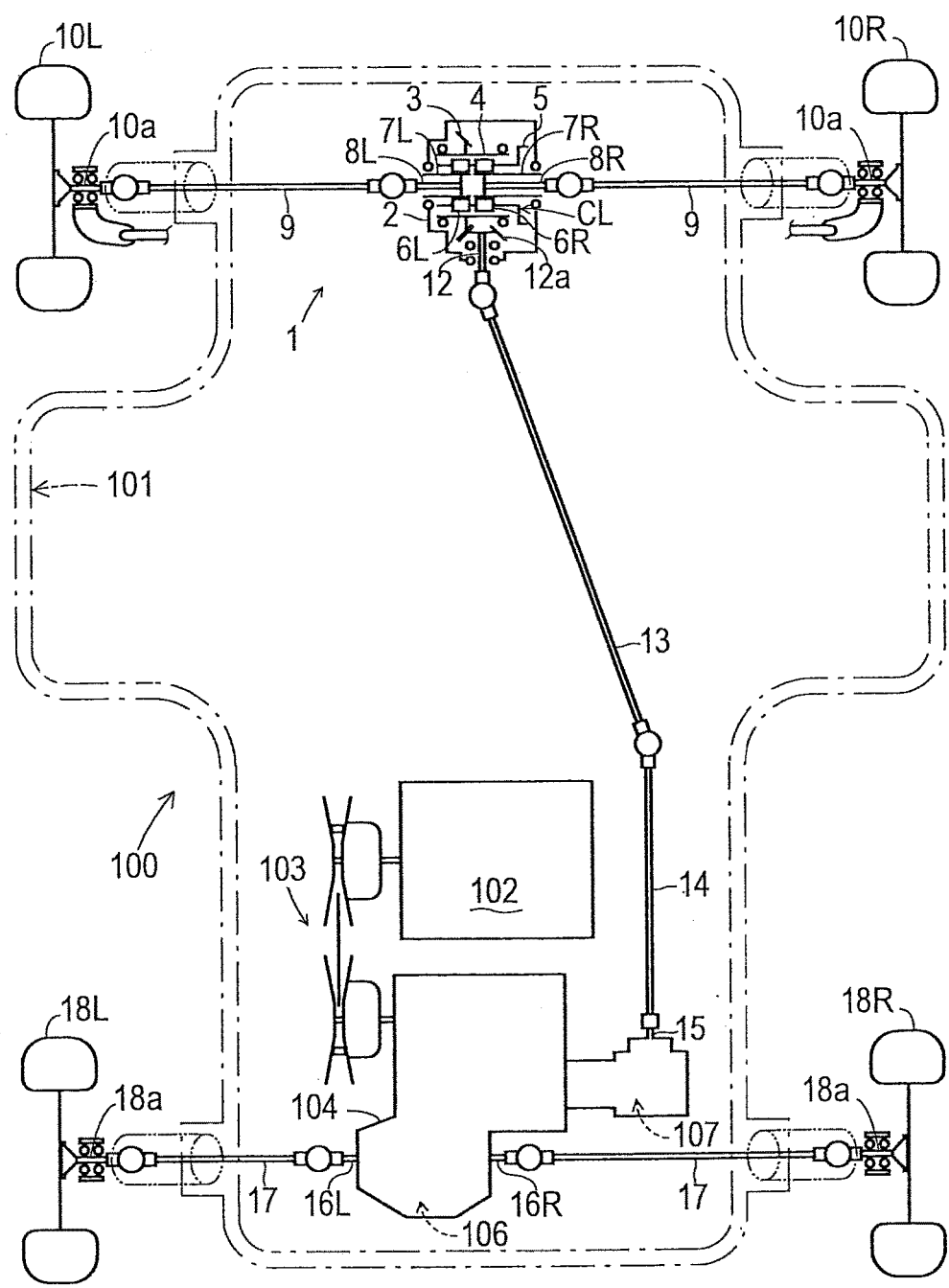
FIG. 1 is a schematic plan view of a vehicle equipped with a transaxle including a bi-directional overrunning clutch CL.

Referring to FIG. 1, a vehicle 100 equipped with an auxiliary transaxle 1 serving as a transaxle including a bi-directional overrunning clutch CL will be described.

Vehicle 100 includes a vehicle body frame 101 to which an engine 102 and a main transaxle 104 are mounted. Main transaxle 104 serves as a rear transaxle of vehicle 100 for driving rear wheels 18R and 18L. Vehicle 100 is provided with a cargo (not shown) on a rear portion thereof so as to serve as a load-carrying vehicle, such as a truck or a utility vehicle. However, any kind of vehicle may serve as vehicle 100 if only a transaxle including bi-directional overrunning clutch CL is adaptable thereto.

A continuously variable belt transmission (CVT) 103 is interposed between an input shaft of main transaxle 104 and an output shaft of engine 102. As usual, main transaxle 104 is installed therein with a gear transmission mechanism 105, a differential gear unit 106 and a power take-off unit 107.

Main transaxle 104 journals right and left rear output shafts 16R and 16L. Axles 18a of respective right and left rear wheels 18L and 18R are elastically suspended from respective right and left output shafts 16R and 16L via respective propeller shafts 17 with respective universal joints.

Auxiliary transaxle 1 is supported by a front portion of vehicle body frame 101 so as to serve as a front transaxle of vehicle 100 for driving right and left front wheels 10R and 10L. Auxiliary transaxle 1 includes a transaxle casing 2 incorporating a later-discussed bi-directional overrunning clutch CL. Transaxle casing 2 journals right and left output shafts 8R and 8L (collectively referred to as "output shafts 8").

Axles 10a are elastically suspended from distal end portions of right and left output shafts 8R and 8L via universal joints so as to be drivingly connected to right and left output shafts 8R and 8L, respectively. Right and left front wheels 10R and 10L are steerable wheels, which are integrated with respective axles 10a and are steerably supported by vehicle body frame 101 as usual.

An input shaft 12 of auxiliary transaxle 1 projects at a rear end portion thereof outward from the rear portion of transaxle casing 2. On the other hand, a power take-off (PTO) shaft 15 projects forward from power take-off unit 107 of main transaxle 104. The rear end portion of input shaft 12 is drivingly connected to PTO shaft 15 via propeller shafts 14 and 13 with a coupling and universal joints.

In main transaxle 104, gear transmission mechanism 105 receives power from engine 102 via CVT 103. Gear transmission mechanism 105 distributes the power between differential gear unit 106 and power take-off unit 106. Differential gear unit 106 distributes the power between right and left output shafts 16R and 16L for driving rear wheels 18R and 18L. Power take-off unit 107 transmits the power to input shaft 12 of auxiliary transaxle 1 via PTO shaft 15 and propeller shafts 14 and 13.

Bi-directional overrunning clutch CL of auxiliary transaxle 1 includes a clutch housing 4, a cylindrical cage 5, right rollers 6R and left rollers 6L (collectively referred to as "rollers 6"), and a right hub 7R and a left hub 7L (collectively referred to as "hubs 7"). Clutch housing 4 serves as an input member of bi-directional overrunning clutch CL, and hubs 7 serve as an output member of bi-directional overrunning clutch CL.

Cage 5 carries right rollers 6R at a right half portion thereof, and carries left rollers 6L at a left half portion thereof. Cage 5 carrying rollers 6, clutch housing 4, right and left hubs 7R and 7L are disposed in transaxle casing 2. Right and left hubs 7R and 7L are disposed coaxially to each other. Cage 5 is disposed coaxially around right and left hubs 7R and 7L. Clutch housing 4 is coaxially disposed around cage 5. In other words, cylindrical clutch housing 4 is disposed coaxially around hubs 7 so that clutch housing 4 and hubs 7 have an annular space between an inner circumferential surface of clutch housing 4 and outer circumferential surfaces of hubs 7, and cylindrical cage 5 carrying rollers 6 is disposed in the annular space.

A proximal (left) end portion of right output shaft 8R is fixedly inserted into right hub 7R, and a proximal (right) end portion of output shaft 8L is fixedly inserted into left hub 7L. Bi-directional overrunning clutch CL is configured so as to allow differential rotation of right and left hubs 7R and 7L, thereby allowing differential rotation of right and left output shafts 8R and 8L (collectively referred to as "output shafts 8").

In transaxle casing 2, a bevel ring gear 3 is connected to clutch housing 4 rotatably integrally with clutch housing 4. A front end portion of an input shaft 12 is journalled by a rear portion of transaxle casing 2. A bevel gear 12a is fixedly provided (or formed) on a front end of input shaft 12. Bevel ring gear 3 and bevel gear 12a mesh with each other in transaxle casing 2.

Therefore, in auxiliary transaxle 1, clutch housing 4 serving as the input member of bi-directional overrunning clutch CL drivingly connected to input shaft 12 is rotated integrally with input shaft 12 receiving power from power take-off unit 107 of main transaxle 104, as long as gear transmission mechanism 105 in main transaxle 104 receives power from engine 102 via CVT 103.

An engagement (or clutch-on) state of bi-directional overrunning clutch CL is defined so that rollers 6 abut against clutch housing 4 so as to transmit the rotary power of clutch housing 4 to hubs 7 and output shafts 8 via cage 5 carrying rollers 6. A disengagement (or clutch-off) state of bi-directional overrunning clutch CL is defined so that rollers 6 are separated from clutch housing 4 so as to isolate hubs 7 and output shafts 8 from the rotary power of clutch housing 4, i.e., so as to make hubs 7 and output shafts 8 rotatable freely from the rotary force of clutch housing 4.

In a later-discussed ondemand mode, once a rotary speed of clutch housing 4 exceeds that of output shafts 8R and 8L, bi-directional overrunning clutch CL of auxiliary transaxle 1 is engaged so that the rotary power of clutch housing 4 is transmitted via bi-directional overrunning clutch CL to output shafts 8R and 8L, and to front wheels 10R and 10L. In this case, vehicle 100 travels in a four-wheel drive mode where all the four wheels 18R, 18L, 10R and 10L are driven.

On the other hand, once the rotary speed of output shafts 8R and 8L exceeds that of clutch housing 4, bi-directional overrunning clutch CL of auxiliary transaxle 1 is disengaged so that the rotary power of clutch housing 4 is not transmitted to front wheels 10R and 10L, whereby vehicle 100 travels in a two-wheel drive mode where only rear wheels 18R and 18L are driven.

Clutch housing 4 is rotated by receiving power from main transaxle 104 regardless of what mode is set. Under the ondemand mode, the rotary speed of front wheels 10R and 10L and output shafts 8R and 8L rotated by receiving a force from the ground according to movement of vehicle 100 is set to slightly exceed the rotary speed of clutch housing 4. Bi-directional overrunning clutch CL is disengaged as long as the rotary speed of output shafts 8R and 8L exceeds the rotary speed of clutch housing 4. Therefore, vehicle 100 travels normally in the two-wheel drive mode, thereby ensuring smooth turning ability and high fuel efficiency.

On the other hand, during traveling on rough roads or in such a case, bi-directional overrunning clutch CL is engaged when the rotary speed of clutch housing 4 becomes lower than that of output shafts 8R and 8L based on the movement of vehicle 100. In other words, at this time, vehicle 100 travels in the automatically set four-wheel drive mode.

Therefore, the traction of vehicle 100 is increased so that vehicle 100 can quickly escape from the slipping condition.

Further, due to bi-directional overrunning clutch CL of auxiliary transaxle 1, during either forward or backward traveling, vehicle 100 set in the ondemand mode travels by the two-wheel drive, except that it travels by the four-wheel drive when rear wheel 18R or 18L slips or is stuck.

Figure 2:
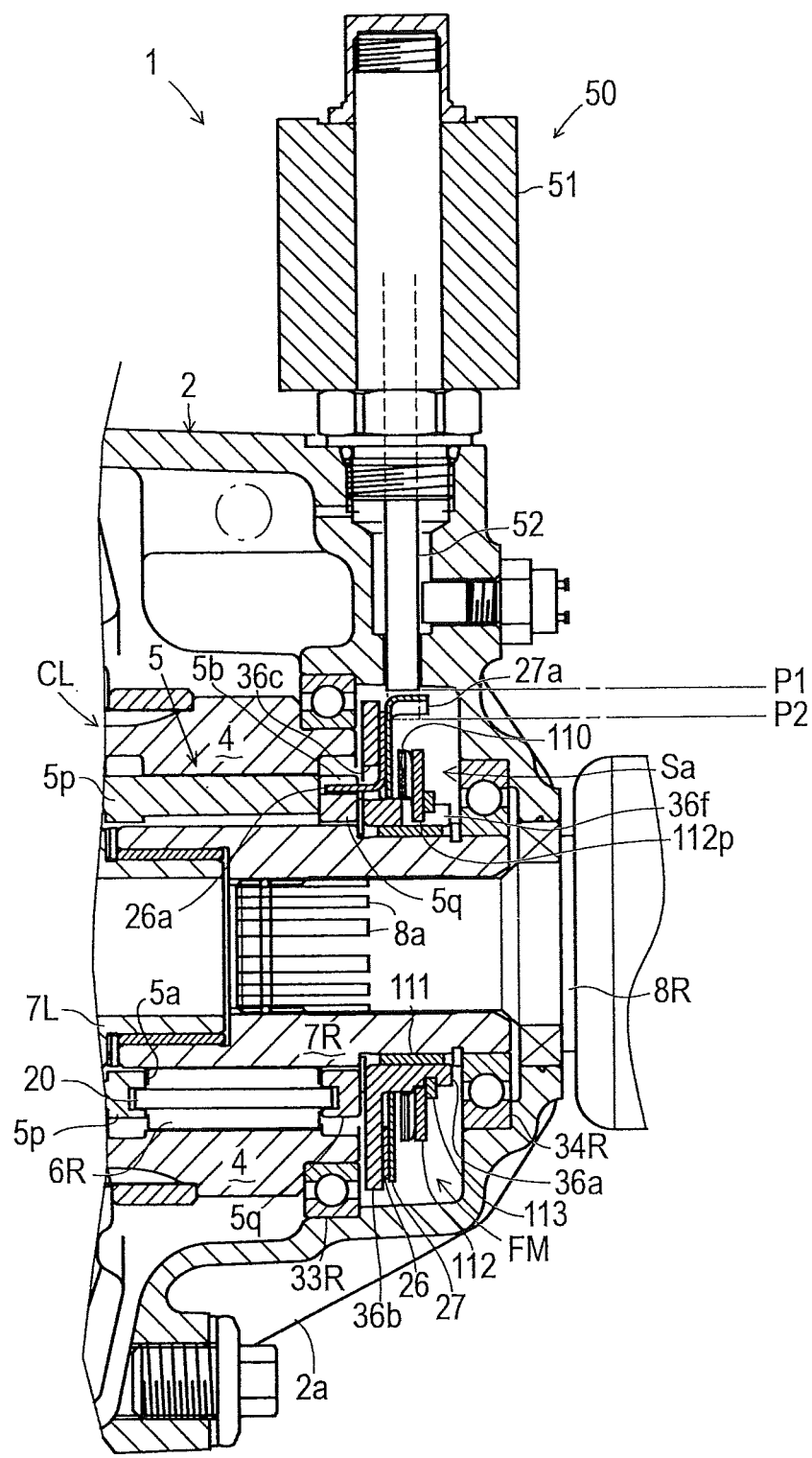
FIG. 2 is a fragmentary sectional view of the transaxle showing a portion thereof incorporating a friction mechanism FM for bi-directional overrunning clutch CL.

Referring to FIG. 2, auxiliary transaxle 1 includes an actuator 50 that is shiftable between an ondemand-off position P1 and an ondemand position P2. When actuator 50 is set at ondemand-off position P1, auxiliary transaxle 1 is set in an ondemand-off mode to cancel the function of bi-directional overrunning clutch CL (to constantly disengage bi-directional overrunning clutch CL). When actuator 50 is set at ondemand position P2, auxiliary transaxle 1 is set in the ondemand mode where bi-directional overrunning clutch CL can be disengaged in response to the above-mentioned traveling conditions.

Actuator 50 is an assembly including a solenoid 51 and a spool 52. Spool 52 can be thrust or withdrawn in transaxle casing 2 depending on whether solenoid 51 is excited or not. Spool 52 penetrates a vertex wall of transaxle casing 2 perpendicularly to an axis of right output shaft 8R. A tip of spool 52 projects into a space Sa in transaxle casing 2.

Solenoid 51 is attached on an outside of the vertex wall of transaxle casing 2, and is electrically connected to an unshown controller. In this regard, vehicle 100 is provided with a mode-selection switch (not shown) adjacent to an operator's seat. The mode-selection switch is optionally operated by an operator on vehicle 100 so as to select either the ondemand mode or the ondemand-off mode of auxiliary transaxle 1.

Actuator 50 for selecting either the ondemand mode or the ondemand-off mode may be a hydraulic actuator (not shown) that selectively has either fluid supply or discharge via an electromagnetic valve so as to be telescopically thrust out or contracted.

Figure 4:
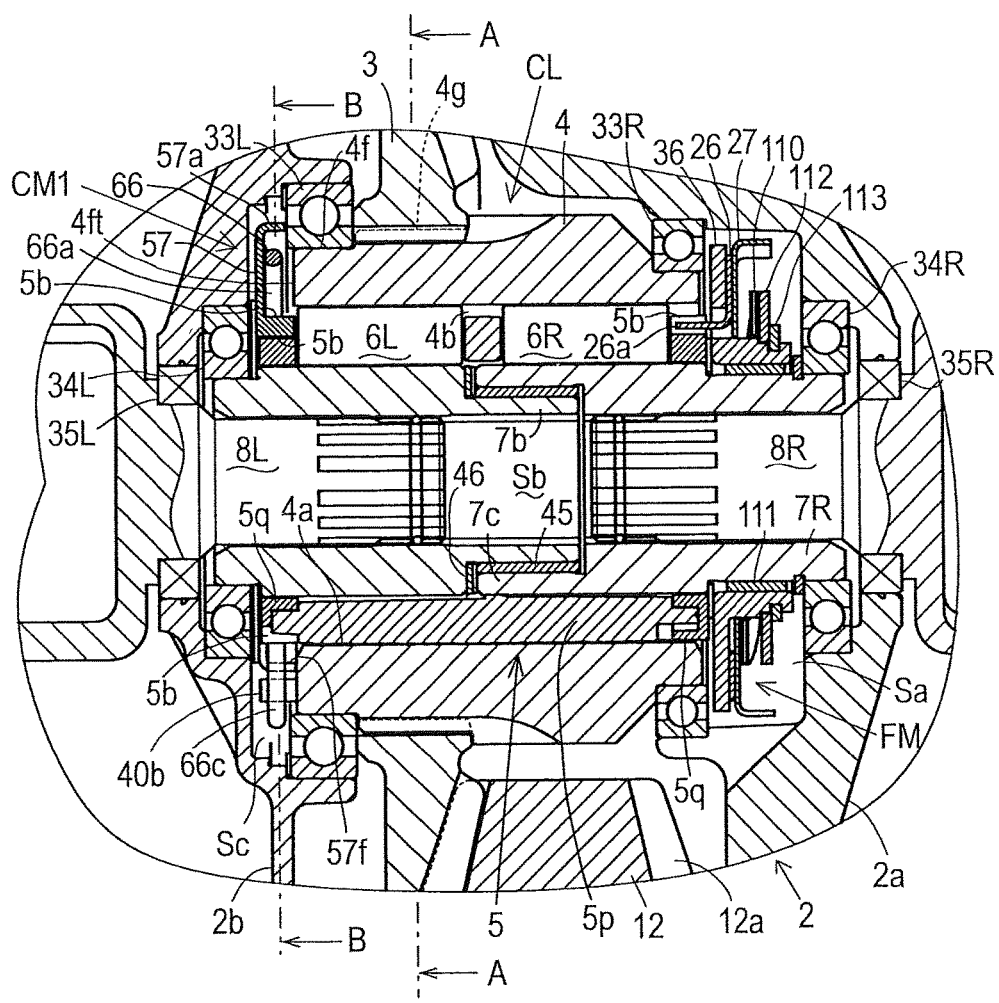
FIG. 4 is a fragmentary sectional plan view of a transaxle according to a first embodiment, incorporating bi-directional overrunning clutch CL, friction mechanism FM, and a clutch-off biasing mechanism CM1.

Referring to FIGS. 2 and 4, transaxle casing 2 includes a main housing 2a and a side cover 2b. Main housing 2a journals right output shaft 8R (serving as one output shaft in this embodiment), and side cover 2b journals left output shaft 8L (serving as the other output shaft in this embodiment). Further, transaxle casing 2 includes an unshown input shaft cover journaling input shaft 12.

Hereinafter, fore-and-aft and right-and-left directions of auxiliary transaxle 1 are defined on an assumption that auxiliary transaxle 1 is located in vehicle 100 so as to place main housing 2a rightward, side cover 2b leftward, and the input shaft cover rearward.

Referring to FIG. 4, clutch housing 4 is a substantially circularly cylindrical member having axial right and left open ends. Clutch housing 4 is journalled by transaxle casing 2 via a right bearing 33R and a left bearing 33L. More specifically, left bearing 33L is fitted on a left end outer circumferential surface of clutch housing 4 so as to journal a left end portion of clutch housing 4 by side cover 2b serving as the left part of transaxle casing 2. Right bearing 33R is fitted on a right end outer circumferential surface of clutch housing 4 so as to journal a right end portion of clutch housing 4 by main housing 2a serving as the right part of transaxle casing 2.

Clutch housing 4 is formed with a splined outer circumferential portion 4g extended rightward from left bearing 33L. Bevel ring gear 3 is spline-fitted at an inner circumferential portion thereof onto splined outer circumferential portion 4g of clutch housing 4, so that bevel ring gear 3 is fitted on clutch housing 4 unrotatably relative to clutch housing 4.

Incidentally, a left end of bevel ring gear 3 abuts against a right end of left bearing 33L so as to prevent bevel ring gear 3 from moving further axially leftward. A right end of bevel ring gear 3 is retained by a step formed (or a spacer fitted (see FIG. 8)) on splined outer circumferential portion 4g of clutch housing 4 so as to prevent bevel ring gear 3 from moving further axially rightward.

Referring to FIGS. 2, 4, 5, 6A and 7A, bi-directional overrunning clutch CL will be described in detail. Cage 5 is disposed substantially coaxially to clutch housing 4 in a space defined surrounded by an inner wall surface 4a of clutch housing 4 and outer wall surfaces of hubs 7. Cage 5 is made of plastic, for example. Cage 5 has a substantially circular cylindrical shape, having right and left distal ends, and has an axial length between the right and left distal ends, which is substantially equal to that of clutch housing 4.

Right and left half portions of cage 5 are formed with respective roller holes 5a aligned along a circumferential direction of cage 5 at regular intervals. In this embodiment, seven right roller holes 5a and seven left roller holes 5a are formed symmetrically with respect to an axial center portion of cage 5.

Each roller hole 5a penetrates cage 5 radially between outer and inner circumferential surfaces of cage 5ach roller hole 5a is formed to have a rectangular opening at each of the outer and inner circumferential surfaces of cage 5. The rectangular shape of the opening of roller hole 5a has proximal and distal ends extended circumferentially of cage 5, and a pair of parallel axially extended edges between the proximal and distal ends thereof.

The proximal end of roller hole 5a is defined as being closer to the axial center of cage 5 between right roller holes 5a and left roller holes 5a. The distal end of roller hole 5a is defined as being closer to either the right or left distal end of cage 5. Therefore, each of right roller holes 5a has a left end as the proximal end thereof, and a right end as the distal end thereof. Each of left roller holes 5a has a right end as the proximal end thereof, and a left end as the distal end thereof.

Figure 5:
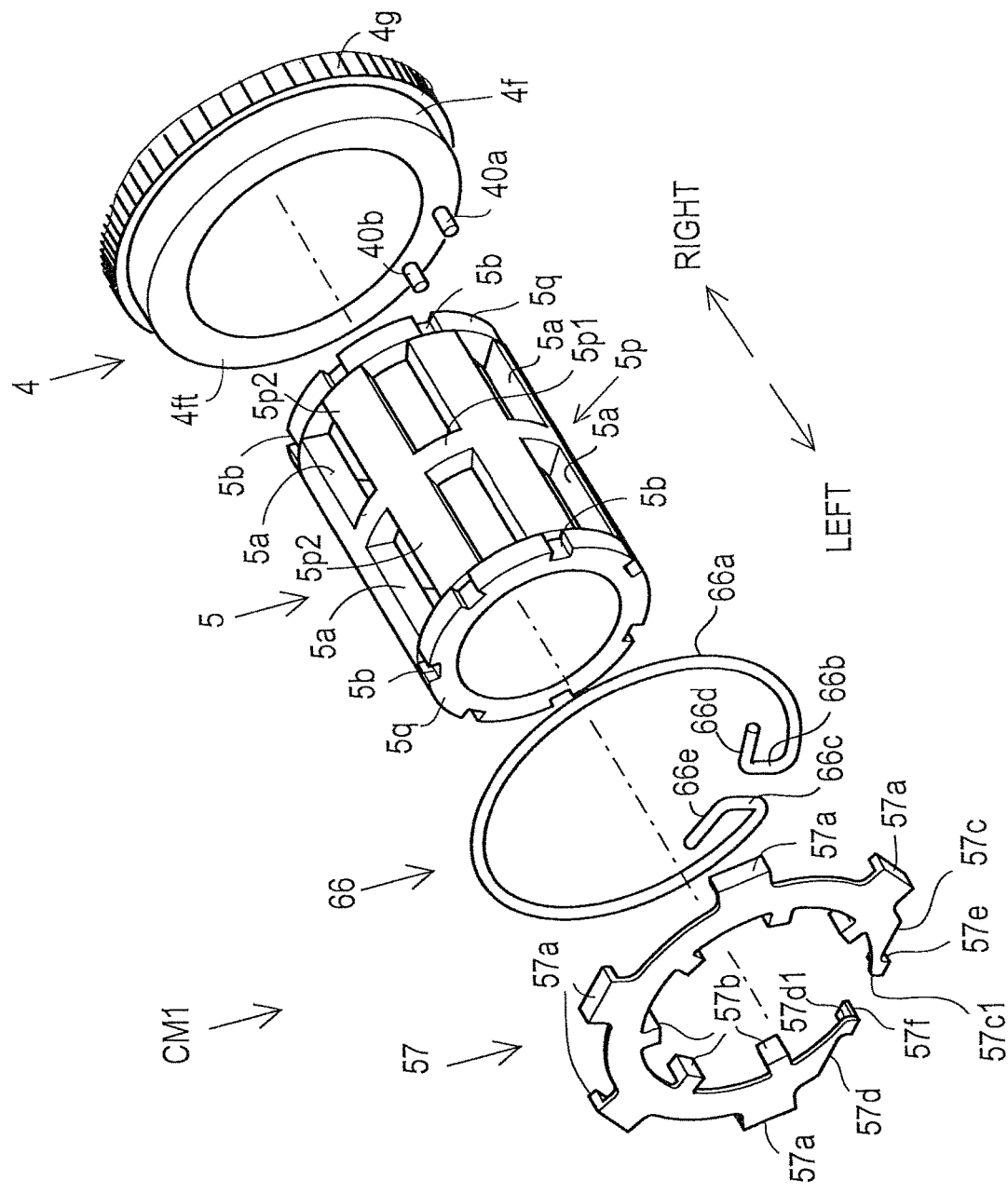
FIG. 5 is a developed perspective view of component members of clutch-off biasing mechanism CM1, including a cage 5 as a component member of bi-directional overrunning clutch CL, when is it disassembled.

Referring to FIGS. 2, 4 and 5, cage 5 includes a cylindrical main part 5p and a pair of end rings 5q fixed at opposite end sides of main part 5p. Roller holes 5a are formed in main part 5p of cage 5. In this regard, as shown in FIG. 5, main part 5p is formed integrally with an axially center ring portion 5p1, and with right and left bridge portions 5p2, which are extended axially rightward and leftward from axially center ring portion 5p1 and are aligned along the circumferential direction of main part 5p. Bridge portions 5p2 have respective proximal ends joined to axially center ring portion 5p1, and have distal ends defined as right and left ends of main part 5p.

Right and left end rings 5q are fixed to respective right and left ends of main part 5p, so that the distal ends of respective bridge portions 5p2 are joined to respective end rings 5q. A distal end surface of each end ring 5q opposite main part 5p is defined as each of the right and left distal ends of cage 5. Outer and inner circumferential surfaces of end rings 5q continue to the outer and inner circumferential surfaces of main part 5p, which are defined as outer and inner circumferential surfaces of axially center ring portion 5p1 and all bridges 5p2.

Therefore, right and left end surfaces of axially center ring portion 5p1 of main part 5p define proximal ends of respective right and left roller holes 5a. Proximal end surfaces of right and left end rings 5q define the distal ends of respective right and left roller holes 5a. Right and left bridge portions 5p2 of main part 5p extended rightward and leftward from axially center ring portion 5p1 define the parallel axially extended edges of respective right and left roller holes 5a.

Each of end rings 5q is formed with grooves 5b aligned along the circumferential direction at regular intervals. Each groove 5b is open radially outward at the outer circumferential surface of end ring 5q, and is open axially outward at the distal end of end ring 5q. In the circumferential direction of cage 5, each groove 5b is disposed between adjoining roller holes 5a. Therefore, in this embodiment, end ring 5q is provided with seven grooves 5b corresponding to seven roller holes 5a aligned in the circumferential direction of cage 5.

Figure 6A:
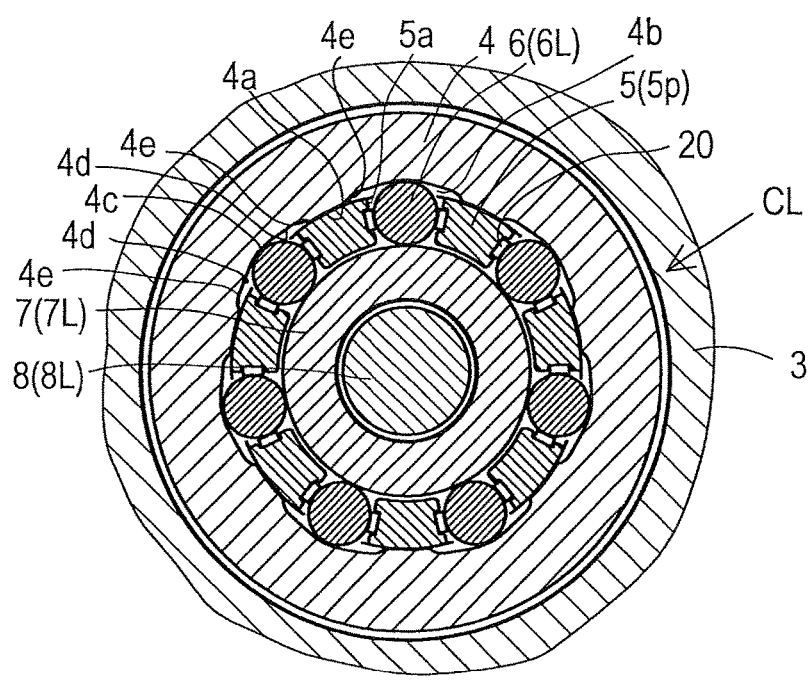
FIG. 6A is a cross sectional view taken along A-A line of FIG. 4 showing bi-directional overrunning clutch CL when it is disengaged.
Figure 7A:
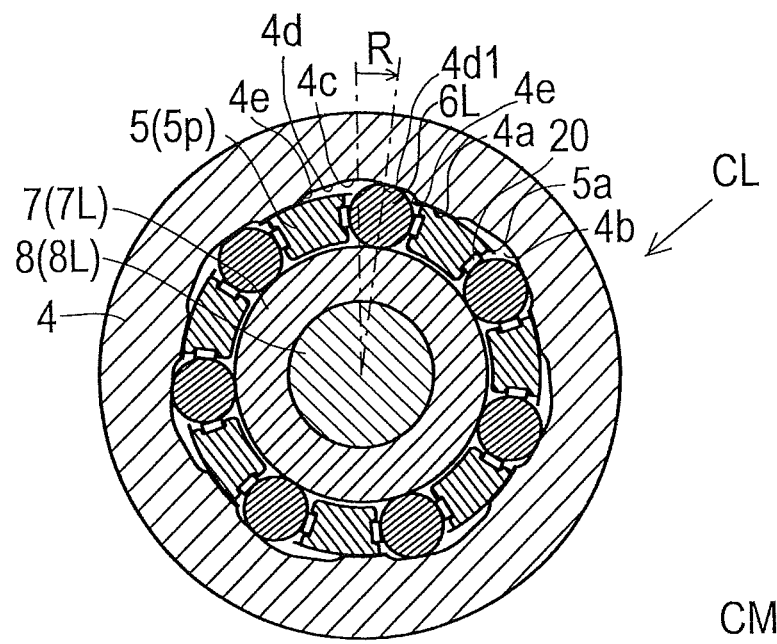
FIG. 7A is a cross sectional view taken along A-A line of FIG. 4 showing bi-directional overrunning clutch CL when it is engaged.

Referring to FIGS. 4, 6A and 7A, left rollers 6L are held in respective left roller holes 5a formed in the left half portion of cage 5, and right rollers 6R in respective right roller holes 5a formed in the right half portion of cage 5. In each roller hole 5a, a pair of spring plates 20 are disposed on the parallel axially extended edges of roller hole 5a. Each spring plate 20 is compressed between an outer circumferential surface of each roller 6 and each edge surface of roller hole 5a. The pair of spring plates 20 bias each roller 6 so as to locate roller 6 at the center of roller hole 5a in the circumferential direction of cage 5.

Incidentally, FIGS. 6A and 7A illustrate sectional views of the left half portion of clutch housing 4 and the left half portion of cage 5, carrying left rollers 6L and fitted on left hub 7L and left output shaft 8L. They are representative of the right and left half portions of clutch housing 4 and the right and left half portions of cage 5, carrying right and left rollers 6R and 6L and fitted on right and left hubs 7R and 7L and output shafts 8R and 8L.

Each circular columnar roller 6 has a diameter that is larger than a radial thickness of cage 5 between the outer and inner circumferential surfaces thereof. Therefore, rollers 6 project inward and outward in radial directions of cage 5 from inner and outer circumferential surfaces of (main part 5p of) cage 5. The portions of right rollers 6R projecting radially inward from the inner circumferential surface of the right half portion of cage 5 to contact an outer circumferential surface of right hub 7R. The portions of left rollers 6L projecting radially inward from the inner circumferential surface of the left half portion of cage 5 to contact an outer circumferential surface of left hub 7L.

Referring to FIGS. 6A and 7A, the inner circumferential portion of each of the right and left half portions of clutch housing 4 is formed with minimum diametric portions 4a and recesses 4b aligned alternately at regular intervals along the circumferential direction of clutch housing 4.

Each minimum diametric portion 4a is disposed between every pair of recesses 4b adjoining each other, so that every pair of minimum diametric portions 4a adjoining each other define opposite ends 4e of each recess 4b therebetween. A radially inward end surface of each minimum diametric portion 4a defines the minimum inner diameter of cylindrical clutch housing 4, and is disposed close to the outer circumferential surface of each of right and left hubs 7R and 7L.

Recesses 4b are arranged to accommodate the portions of respective rollers 6 projecting radially outward from the outer circumferential surface of cage 5 (i.e., main part 5p). Each recess 4b becomes deepest in the radially outward direction thereof at the circumferential center portion thereof. The deepest portion of recess 4b is referred to as deepest center portion 4c. Each deepest center portion 4c of recess 4b defines the maximum inner diameter of cylindrical clutch housing 4.

Minimum diametric portions 4a and recesses 4b at each of the right and left half portions of clutch housing 4 correspond in number to rollers 6 aligned in the circumferential direction of cage 5 in each of the right and left half portions of cage 5. Therefore, in this embodiment, seven minimum diametric portions 4a and seven recesses 4b are formed on the inner circumferential portion of each of the right and left half portions of clutch housing 4.

Incidentally, referring to FIG. 4, in this embodiment, each minimum diametric portion 4a at the right half portion of clutch housing 4 and each minimum diametric portion 4a at the left half portion of clutch housing 4 are joined to each other so as to be formed as a single minimum diametric portion 4a extended between right and left ends of clutch housing 4 to be placed close to the outer circumferential surface of cage 5. Also, each recess 4b at the right half portion of clutch housing 4 and each recess 4b at the left half portion of clutch housing 4 are joined to each other so as to be formed as a single recess 4a extended between right and left ends of cage 5 (i.e., main part 5p) to accommodate each right roller 6R in the right portion thereof, and each left roller 6L in the left portion thereof. In other words, in this embodiment, clutch housing 4 is formed at the axial center portion thereof with no partition between right minimum diametric portions 4a and recesses 4b and left minimum diametric portions 4a and recesses 4b.

Alternatively, as shown in later-discussed alternative embodiments, clutch housing 4 may be formed to have right minimum diametric portions 4a and recess 4b and left minimum diametric portions 4a and recesses 4b partitioned from each other by the axial center portion thereof.

Each recess 4b is formed with a pair of sloped surfaces 4d extended from deepest center portion 4c to circumferentially opposite ends 4e bounding on minimum diametric portions 4a. In this regard, when bi-directional overrunning clutch CL is viewed in the axial direction of output shafts 8, in each recess 4b, one of the pair of sloped surfaces 4d is extended circumferentially clockwise from deepest center portion 4c so as to correspond to rotation of cage 5 relative to clutch housing 4 during a normal rotation of clutch housing 4 (when rear wheels 18R and 18L rotate forward), and the other of the pair of sloped surfaces 4d is extended circumferentially counterclockwise from deepest center portion 4c so as to correspond to rotation of cage 5 relative to clutch housing 4 during a reverse rotation of clutch housing 3 (when rear wheels 18R and 18L rotate backward). Therefore, bi-directional overrunning clutch CL is available regardless of whether vehicle 100 travels forward or backward.

Deepest center portion 4c of each recess 4b has a radial distance from the outer circumferential surface of hub 7, which is larger than the diameter of roller 6. Each roller 6 is biased by its spring plates 20 to be located at deepest center portion 4c of corresponding recess 4b.

Referring to FIG. 6A, each roller 6 located at deepest center portion 4c is separated from clutch housing 4, so that cage 5 carrying rollers 6 contacting hubs 7 fixed on output shafts 8 is isolated from the rotary power of clutch housing 4 driven via bevel ring gear 3 by input shaft 12 receiving power from PTO shaft 15 in vehicle 100, thereby isolating output shafts 8 from the rotary power of clutch housing 4.

The state such as shown in FIG. 6A is defined as the clutch-off (disengagement) state of bi-directional overrunning clutch CL where bi-directional overrunning clutch CL is disengaged. As mentioned above, when actuator 50 is set at ondemand position P2, as far as the rotary speed of output shafts 8 exceeds the rotary speed of clutch housing 4, bi-directional overrunning clutch CL is disengaged.

Each recess 4b has a radial distance at sloped surface 4d from the outer circumferential surface of hub 7, which is reduced as it goes from deepest center portion 4c to end 4e along sloped surface 4d. The radial distance of each recess 4b at end 4e from the outer circumferential surface of hub 7 is smaller than the diameter of roller 6. Therefore, referring to FIG. 7A, each sloped surface 4d has a circumferentially intermediate portion, serving as a wedge portion 4d1, whose radial distance from the outer circumferential surface of hub 7 is equal to the diameter of roller 6. Therefore, in each recess 4b, deepest center portion 4c and the portions of opposite sloped surfaces 4d having deepest center portion 4c therebetween and between opposite wedge portions 4d1 are defined as a radially expanded portion of clutch housing 4, which has an inner diameter that is greater than an inner diameter of wedge portion 4d1.

When the rotary speed of either right output shaft 8R or left output shaft 8L is reduced to become less than the rotary speed of clutch housing 4, cage 5 having frictional resistance from friction mechanism FM follows the speed reduction of hubs 7 fixed on output shafts 8 so as to rotate relative to clutch housing 4. When the rotation degree of cage 5 relative to clutch housing 4 reaches an angle R, roller 6 comes to abut against wedge portion 4d1 of sloped surface 4d, thereby drivingly connecting hubs 7 and output shafts 8 to clutch housing 4 via rollers 6 carried by cage 5. The state such as shown in FIG. 7A is defined as the clutch-on state (engagement) of bi-directional overrunning clutch CL where bi-directional overrunning clutch CL is engaged.

Cage 5 receiving the friction resistance from friction mechanism FM to rotate relative to clutch housing 4 has a toque in the rotation direction relative to clutch housing 4. Therefore, rollers 6 abutting against wedge portions 4d1 of clutch housing 4 tend to rotate further in the rotation direction of cage 5 relative to clutch housing 4, thereby being pressed and nipped between sloped surfaces 4d of clutch housing 4 and the outer circumferential surface of hub 7, so that rollers 6 are hard to be released from wedge portions 4d1 of clutch housing 4. Accordingly, cage 5 becomes unrotatable further in the rotation direction relative to clutch housing 4, and is hard to rotate in the opposite direction so as to return to its initial position relative to clutch housing 4. Such a state where rollers 6 are engaged to clutch housing 4 and are hard to be released from clutch housing 4 is defined as a wedge-like engagement state of bi-directional overrunning clutch CL.

Bi-directional overrunning clutch CL is provided with a later-discussed clutch-off biasing mechanism CM1 to release bi-directional overrunning clutch CL from the wedge-like engagement state, i.e., to forcibly separate rollers 5 from clutch housing 4 so as to return bi-directional overrunning clutch CL to the clutch-off (disengagement) state of bi-directional overrunning clutch CL where cage 5 is rotatable relative to clutch housing 4.

A proximal left end portion of right output shaft 8R and right hub 7R spline-fitted on the proximal left end portion of right output shaft 8R are inserted into cage 5 through the right end opening of cage 5. A proximal right end portion of left output shaft 8L and left hub 7L spline-fitted on the proximal right end portion of left output shaft 8L are inserted into cage 5 through the left end opening of cage 5.

Therefore, in transaxle casing 2, right and left output shafts 8R and 8L are disposed coaxially to each other, right and left hubs 7R and 7L fixed on respective right and left output shafts 8R and 8L are disposed coaxially to each other, cage 5 is disposed coaxially around right and left hubs 7R and 7L so that right and left rollers 6R and 6L carried by cage 5 are disposed along the respective outer circumferential surfaces of right and left hubs 7R and 7L, and clutch housing 4 is disposed coaxially around cage 5 so as to accommodate right and left rollers 6R and 6L in respective recesses 4b on the inner circumferential portion thereof.

In cage 5, cylindrical hubs 7R and 7L are spigot-and-socket joined at proximal end portions thereof to each other, so as to have substantially constant outer and inner diameters (i.e., maximum outer diameter and minimum inner diameter of hubs 7) in the substantially whole range thereof surrounded by cage 5. More specifically, the proximal end portion of one of right and left hubs 7R and 7L (in this embodiment, the right end portion of left hub 7L) is formed as a spigot portion 7b having a smaller outer diameter than the maximum outer diameter of hubs 7, and the proximal end portion of the other of right and left hubs 7R and 7L (in this embodiment, the left end portion of right hub 7R) is formed as a socket portion 7c having a larger inner diameter than the minimum inner diameter of hubs 7.

Spigot portion 7b is fitted into socket portion 7c so as to allow differential rotation of right and left hubs 7R and 7L. In this regard, a needle bearing 45 is fitted in a radial gap between an outer circumferential surface of spigot portion 7b and an inner circumferential end of socket portion 7c. A washer 46 is fitted in an axial gap between a distal stepped end of spigot portion 7b and a proximal end of socket portion 7c. Therefore, right and left hubs 7R and 7L spigot-and-socket joined to each other are allowed to rotate differentially, thereby allowing right and left output shafts 8R and 8L to rotate differentially.

Spigot and socket portions 7b and 7c of hubs 7R and 7L project further axially proximally from proximal ends of right and left output shafts 8R and 8L. Therefore, right and left hubs 7R and 7L spigot-and-socket like joined to each other has a space Sb therein surrounded by the inner circumferential surface of spigot portion 7b between the proximal ends of right and left output shafts 8R and 8L. Space Sb is filled with lubricating fluid so as to surely lubricate splines on outer circumferential surfaces of right and left output shafts 8R and 8L and the corresponding splines on the inner circumferential surfaces of right and left hubs 7R and 7L.

A distal right end portion of right hub 7R projects rightward from the right end of cage 5 and is journalled by main housing 2a serving as the right part of transaxle casing 2 via a bearing 34R. A distal left end portion of left hub 7L projects leftward from the left end of cage 5 and is journalled by side cover 2b serving as the left part of transaxle casing 2 via a bearing 34L.

A distal right portion of right output shaft 8R projects rightward from the right end of right hub 7R so as to be journalled by a right end portion of main housing 2a and projects rightward from the right end portion of main housing 2a so as to be formed with a coupling portion to be coupled to propeller shaft 17R via the universal joint. A distal left portion of left output shaft 8L projects leftward from the left end of left hub 7L so as to be journalled by a left end portion of side cover 2b and projects leftward from the left end portion of side cover 2b so as to be formed with a coupling portion to be coupled to propeller shaft 17L via the universal joint.

A right end of bearing 33R, the right end of clutch housing 4, and the right end of cage 5 substantially coincide to one another in location in the axial direction of clutch housing 4. Therefore, bearing 34R fitted circumferentially on the right end portion of right hub 7R has an outer diameter, which is smaller than that of bearing 33R fitted circumferentially on the right end portion of clutch housing 4, and is disposed rightward from bearing 33R, thereby ensuring space Sa for arranging friction mechanism FM between bearings 33R and 34R in main housing 2a rightward from the right end portion of cage 5 and around the right end portion of hub 7R.

A left end of bearing 33L and the left end of clutch housing 4 substantially coincide to each other in location in the axial direction of clutch housing 4, and left end ring 5q of cage 5 serving as the left end portion of cage 5 projects leftward from the left end of clutch housing 4. Therefore, bearing 34L fitted circumferentially on the left end portion of left hub 7L projecting leftward from the left end of cage 5 has an outer diameter, which is smaller than that of bearing 33L fitted circumferentially on the left end portion of clutch housing 4, and is disposed leftward from bearing 33L, thereby ensuring a later-discussed space Sc for arranging a later-discussed clutch-off biasing mechanism CM1 between bearings 33L and 341 in side cover 2b leftward from the left end of clutch housing 4 and around left end ring 5q of cage 5.

Figure 3:
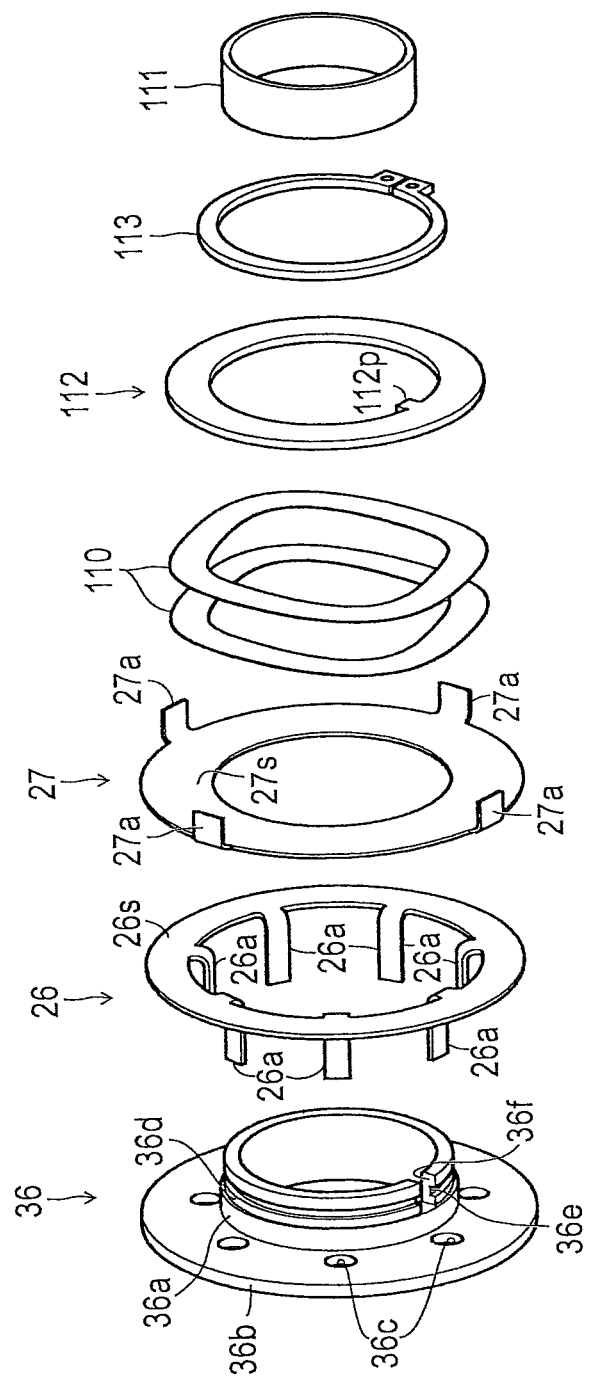
FIG. 3 is a developed perspective view of component members of friction mechanism FM when it is disassembled.

Friction mechanism FM provided in space Sa in transaxle casing 2 will now be described with reference to FIGS. 2, 3 and 4. Friction mechanism FM includes a spacer 36, a rotary-side friction plates 26, a fixed-side friction plates 27, at least one waved washer 110, a retaining plate 112, a retaining ring 113, and a needle bearing 111. Needle bearing 111 is substantially circularly cylindrical.

Spacer 36 includes a horizontally axial sleeve portion 36a and a vertical disc portion 36b. Sleeve portion 36a is fitted at an inner circumferential surface thereof on the distal right portion of right hub 7R projecting rightward from the right end (i.e., right end ring 5q) of cage 5 so that spacer 36 is disposed around the distal right portion of right hub 7R rotatably relative to right hub 7R. Vertical disc portion 36b is formed as a flange extended radially outward from a proximal left end of horizontal sleeve portion 36a.

Sleeve portion 36a is formed with a step 36d and an annular groove 36e. Step 36d is formed radially on an axially intermediate outer circumferential portion of sleeve portion 36a so that a distal right portion of sleeve portion 36a extended distally rightward from step 36d has an outer diameter which is smaller than that of a proximal left portion of sleeve portion 36a extended proximally leftward from step 36d. Annular groove 36e is formed on an outer circumferential portion of the distal right portion of the distal right portion sleeve portion 36a extended distally rightward from step 36d.

Sleeve portion 36a is cut off by a slit 36f axially extended from the distal right end of sleeve portion 36a to approach the proximal left end portion of sleeve portion 36a formed with vertical disc portion 36b. Vertical disc portion 36b is formed with at least one through hole 36c. In this embodiment, seven through holes 36c are formed at regular intervals along the circumferential direction of vertical disc portion 36b.

Rotary-side friction plate 26 includes a substantially annular disc portion 26s and at least one engagement pawl 26a. In this embodiment, rotary-side friction plate 26 is formed with seven engagement pawls 26a. Each engagement pawl 26a is extended radially inward from an inner circumferential edge of disc portion 26s, and is bent at a substantially right angle so as to extend along the axial direction.

Each engagement pawl 26a is extended leftward so as to be passed through each through hole 36c formed in vertical disc portion 36b of spacer 36 at the proximal left end of spacer 36, and is fitted into each of grooves 5b formed in end ring 5q disposed at the right end of cage 5, so that rotary-side friction plate 26 is unrotatable relative to cage 5, and is restricted in rotatability relative to spacer 36, thereby restricting the rotatability of spacer 36 relative to cage 5. In this state, disc portion 26s of rotary-side friction plate 26 contacts vertical disc portion 36b of spacer 36. Spacer 36 does not contact bearing 33R and clutch housing 4.

Fixed-side friction plate 27 includes a substantially annular disc 27s and at least one stopper pawl 27a. In this embodiment, fixed-side friction plate 27 is formed with four stopper pawls 27a. Each stopper pawl 27a is extended radially outward from an outer circumferential edge of disc portion 27s, and is bent at a substantially right angle so as to extend along the axial direction. Disc portions 26s and 27s contact each other so that engagement pawls 26a of rotary-side friction plate 26 and stopper pawls 27a of fixed-side friction plate 27 are extended axially opposite each other. Therefore, in transaxle casing 2, fixed-side friction plate 27 is disposed on the distal right side of rotary-side friction plate 26 so as to extend stopper pawls 27a distally rightward.

Rotary-side friction plate 26 and fixed-side friction plate 27 are disposed around the proximal left portion of sleeve portion 36a of spacer 36 extended leftward from step 36d. In this regard, the inner circumferential edge of fixed-side friction plate 27 is diametrically smaller than the rotary-side friction plate 26. Therefore, an inner circumferential edge of fixed-side friction plate 27 contacts an outer circumferential surface of horizontal sleeve portion 36a, while the inner circumferential edge of rotary-side friction plate 26 does not contact the outer circumferential surface of horizontal sleeve portion 36a.

Waved washer 110 is attached on the outer circumferential surface of the proximal left portion of sleeve portion 36a rightward from fixed-side friction plate 27. Waved washer 110 presses fixed-side friction plate 27 against vertical disc portion 36b in the condition that rotary-side friction plate 26 is disposed between vertical disc portion 36b and fixed-side friction plate 27. Therefore, rotary-side friction plate 26 and fixed-side friction plate 27 are pressed against vertical disc portion 36b.

Annular retaining plate 112 includes a knob 112p projecting radially inward from an inner circumferential edge thereof. Retaining plate 112 adjoins waved washer 110 on the distal right side of wave washer 110 and is attached at the inner circumferential edge thereof on the outer circumferential surface of the distal right portion of sleeve portion 36a rightward from step 36d so as to fit knob 112p into slit 36f. Accordingly, retaining plate 112 is unrotatable relative to spacer 36. Retaining plate 112 does not contact vertical disc portion 36b but is leaned against step 36d of sleeve portion 36a because the inner circumferential edge of retaining plate 112 is diametrically smaller than the respective inner circumferential edges of rotary-side friction plate 26 and fixed-side friction plate 27.

Retaining ring 113 is disposed on the distal right side of retaining plate 112, and is fitted at an inner circumferential edge thereof into groove 36e so as to fix the axial position of retaining plate 112 on sleeve portion 36a.

Operation of bi-directional overrunning clutch CL, including clutch housing 4, cage 5, rollers 6 and hubs 7, will now be described with reference to FIGS. 2, 3, 4, 6A and 7A.

When solenoid 51 is unexcited, the tip of spool 52 is disposed at a position P1 outside of a rotation locus of stopper pawls 27a of fixed-side friction plate 27. Position P1 is defined as ondemand-off position P1 of actuator 50 for setting bi-directional overrunning clutch CL in an ondemand-off mode. In bi-directional overrunning clutch CL set in the ondemand-off mode, during rotation of cage 5 according to rotation of clutch housing 4 and hubs 7, fixed-side plate 27 pressed against rotary-side friction plate 26 by wave washer 110 is rotatable together with rotary-side friction plate 26 retained by cage 5 without frictionally resisting rotary-side friction plate 26. Therefore, cage 5 does not receive the frictional resistance generated by friction mechanism FM. Therefore, rollers 6 are free from the wedged-like engagement so that rollers 6 are movable along normal and reverse rotation directions in respective recesses 4a. Therefore, bi-directional overrunning clutch CL of auxiliary transaxle 1 is out of its clutch-function, i.e., bi-directional overrunning clutch CL is constantly disengaged.

When solenoid 51 is excited, spool 52 is thrust so that the tip of spool 52 is disposed at a position P2 as shown in FIG. 2, where the tip of spool 52 is entered into a space between any two stopper pawls 27a adjoining each other along the circumferential direction of fixed-side friction plate 27. Position P2 is defined as ondemand position P2 of actuator 50 for setting bi-directional overrunning clutch CL in an ondemand mode.

Once any one of stopper pawls 27a of fixed-side friction plate 27 rotating to follow the rotation of rotary-side friction plate 26 becomes to abut against spool 52 entered in the space between adjoining two stopper pawls 27a, fixed-side friction plate 27 is hindered by spool 52 from further rotating to follow the rotation of rotary-side friction plate 26. In other words, spool 52 at ondemand position P2 keeps fixed-side friction plate 27 stationary in transaxle casing 2. Since fixed-side friction plate 27 whose disc portion 27s is pressed against disc portion 26s of rotary-side friction plate 26 by wave washer 110 is kept stationary, disc portion 27s of fixed-side friction plate 27 frictionally resists disc portion 26s of rotary-side friction plate 26 rotating together with cage 5.

The frictional resistance is applied to cage 5 via rotary-side friction plate 26. Therefore, if the rotation of hub 7 becomes slower than the rotation of clutch housing 4 (because of slipping of any of right and left rear wheels 18R and 18L, for example), cage 5 becomes slow to follow hub 7 so as to rotate relative to clutch housing 4 until rollers 6 abut against wedge portions 4d1 of clutch housing 4, thereby engaging bi-directional overrunning clutch CL of auxiliary transaxle 1.

From this state, if the rotary speed of hub 7 increases to exceed the rotary speed of clutch housing 4, later-discussed clutch-off biasing mechanism CM1 functions to quickly and smoothly cancel the wedged-like engagement of bi-directional overrunning clutch CL, whereby hub 7 becomes rotatable freely from the rotational force of clutch housing 4.

Referring to FIGS. 4, 5, 6A, 6B, 7A and 7B, clutch-off biasing mechanism CM1 of auxiliary transaxle 1 will be described. In auxiliary transaxle 1, clutch-off biasing mechanism CM1 is disposed opposite friction mechanism FM with respect to bevel ring gear 3 disposed at the axially intermediate portion of bi-directional overrunning clutch CL. On the above-mentioned assumption that friction mechanism FM is disposed rightward of bi-directional overrunning clutch CL, clutch-off biasing mechanism CM1 is disposed leftward of bi-directional overrunning clutch CL.

Clutch-off biasing mechanism CM1 includes clutch housing 4, cage 5, left hub 7L, a spring holder 57, and a wire spring clip 66. Wire spring clip 66 is interposed via spring holder 57 between clutch housing 4 and cage 5. Substantially discoid spring holder 57 is detachably attached to the left end portion of cage 5. A left side of spring holder 57 facing bearing 34L is defined as a distal side of spring holder 57 axially opposite bearing 33L, clutch housing 4 and cage 5, and a right side of spring holder 57 is defined as a proximal side of spring holder 57 facing bearing 33L, clutch housing 4 and cage 5.

Clutch housing 4 is formed with a left end portion 4f extended leftward from splined outer circumferential portion 4g. Left end portion 4f is inserted through bearing 33L, and is formed at an utmost left end thereof with a vertical end surface 4ft. Left end surface 4ft substantially coincides to a left end of bearing 33L in location in the axial direction of output shafts 8, or may be disposed rather proximally rightward from the left end of bearing 33L.

As mentioned above, side cover 2b serving as the left part of transaxle casing 2 supports bearing 33L journaling left end portion 4f of clutch housing 4 and bearing 34L journaling the left portion of left hub 7L. Bearings 33L and 34L have an axial gap therebetween in the axial direction of output shafts 8, and have a radial gap therebetween in the radial direction of output shafts 8. In correspondence to the axial and radial gaps between bearings 33L and 34L, side cover 2b is formed to ensure a space Sc around left hub 7L and leftward from clutch housing 4.

Space Sc is sufficiently large for arranging left end ring 5q of cage 5, spring holder 57 and wire spring clip 66 to constitute clutch-off biasing mechanism CM1. In this regard, the left end of main part 5p of cage 5, defining left ends of left rollers 6L in respective left roller holes 5a, is disposed to substantially coincide to left end surface 4ft of clutch housing 4 in location in the axial direction of output shafts 8. Therefore, left end ring 5q of cage 5 projects distally leftward from left end surface 4ft of clutch housing 4 so as to be disposed between bearing 34L and the left end of main part 5p of cage 5.

A pair of housing pins 40a and 40b project axially leftward from left end surface 4ft of clutch housing 4. Housing pins 40a and 40b have a gap g1 therebetween. Housing pins 40a and 40b are columnar projections formed integrally with clutch housing 4. Alternatively, housing pins 40a and 40b may be individual members separated from clutch housing 4 and may be fixed to clutch housing 4.

Referring to FIG. 5, spring holder 57 is ring-shaped so as to have an outer circumferential edge and an inner circumferential edge. Spring holder 57 is formed along the outer circumferential edge thereof with guide pawls 57a (in this embodiment, five guide pawls 57a). Guide pawls 57a are extended radially outward from the outer circumferential edge of spring holder 57, and are bent to project proximally rightward so as to abut against bearing 33L, thereby ensuring a sufficient axial width of space Sc for arranging wire spring clip 66 along guide pawls 57a while keeping spring holder 57 rotatable relative to clutch housing 4.

Spring holder 57 is also formed along the inner circumferential edge thereof with engagement pawls 57b (in this embodiment, six inner engagement pawls 57b). Engagement pawls 57b are extended radially inward from the inner circumferential edge of spring holder 57, and are bent to project proximally rightward so as to be fitted into corresponding grooves 5b formed in left end ring 5q of cage 5.

In this regard, right and left end rings 5q, each of which is formed with seven grooves 5b, are disposed at the right and left ends of cage 5. As mentioned above, seven engagement pawls 26a of rotary-side friction plate 26 in friction mechanism FM are fitted into respective grooves 5b formed on end ring 5*q* disposed at the right end of cage 5. In other words, common end ring 5*q* may serve as either right end ring 5*q* to engage with rotary-side friction plate 26 of friction mechanism FM or left end ring 5*q* to engage with spring holder 57 of clutch-off biasing mechanism CM1, thereby promoting standardization of a component member of cage 5.

Further, spring holder 57 is formed with a pair of crosscut edges 57*c* and 57*d*, which are formed by cutting off the ring-shape of spring holder 57 along a chord-like line extended between opposite points on the outer circumferential edge of spring holder 57 through two adjoining points on the inner circumferential edge of spring holder 57. Crosscut edges 57*c* and 57*d* have respective ends 57*c*1 and 57*d*1 corresponding to the two adjoining points on the inner circumferential edge of spring holder 57, so as to have a gap g2 between ends 57*c*1 and 57*d*1.

As mentioned above, six engagement pawls 57*b* are fitted into six grooves 5*b*. Remaining one groove 5*b* has engagement pawls 57*b* absent therefrom. Gap g2 between ends 57*c*1 and 57*d*1 of crosscut edges 57*c* and 57*d* of spring holder 57 corresponds to the absence of engagement pawl 57*b* from groove 5*b*.

Spring holder 57 is formed on respective ends 57*c*1 and 57*d*1 of crosscut edges 57*c* and 57*d* with a pair of pressure pawls 57*e* and 57*f*. Pressure pawls 57*e* and 57*f* are extended radially outward from respective ends 57*c*1 and 57*d*1 of crosscut edges 57*c* and 57*d*, and are bent to project proximally rightward toward the left end of cage 5. Gap g2 between pressure pawls 57*e* and 57*f* on ends 57*c*1 and 57*d*1 of crosscut edges 57*c* and 57*d* is as wide as gap g1 between housing pins 40*a* and 40*b*.

Wire spring clip 66 is a wire made of elastic material, such as steel. The wire serving as wire spring clip 66 is circularly looped so that wire spring clip 66 has a circularly looped portion 66*a*, which has a centrifugal spring force when it is compressed centripetally. Wire spring clip 66 is bent at equal lengths from both ends of the wire serving as wire spring clip 66, defined as ends of circularly looped portion 66*a*, so as to form a pair of radial end portions 66*b* and 66*c* facing each other. Radial end portions 66*b* and 66*c* are extended radially inward from the respective ends of circularly looped portion 66*a* and parallel to each other.

Wire spring clip 66 is further bent at respective radially inward ends of radial end portions 66*b* and 66*c* so as to form a pair of tangent end portions 66*d* and 66*e* extended tangentially away from each other to the respective ends of the wire serving as wire spring clip 66.

In space Sc around left end ring 5*q* of cage 5, spring holder 57 is located so that guide pawls 57*a* of spring holder 57 abut at right ends thereof against bearing 33L so as to allow spring holder 57 to rotate relative to clutch housing 4, and so that engagement pawls 57*b* of spring holder 57 are fitted into corresponding grooves 5*b* of left end ring 5*q* of cage 5 so as to engage spring holder 57 to cage 5 unrotatably relative to cage 5.

In the state where spring holder 57 is disposed in space Sc so as to be associated with clutch housing 4 and cage 5 as mentioned above, wire spring clip 66 is disposed in space Sc so that guide pawls 57*a* of spring holder 57 are aligned along circularly looped portion 66*a* of wire spring clip 66. Housing pin 40*a* is located at an angle space between one end of circularly looped portion 66*a* and radial end portion 66*b*, and housing pin 40*b* is located at an angle space between the other end of circularly looped portion 66*a* and radial end portion 66*c*. Pressure pawl 57*e* of spring holder 57 is located at an angle space between radial end portion 66*b* and tangent end portion 66*d* of wire spring clip 66, and pressure pawl 57*f* of spring holder 57 is located at an angle space between radial end portion 66*c* and tangent end portion 66*e* of wire spring clip 66.

Therefore, the pair of radial end portions 66*b* and 66*c* are disposed between housing pin 40*a* and pressure pawl 57*e* at one end 57*c*1 of crosscut edge 57*c* and housing pin 40*b* and pressure pawl 57*f* at the other end 57*d*1 of crosscut edge 57*d*. Tangent end portions 66*d* and 66*e* are disposed between respective pressure pawls 57*e* and 57*f* of spring holder 57 and the outer circumferential surface of left end ring 5*q* of cage 5, so as to extend tangentially with respect to cage 5.

As a result, circularly looped portion 66*a* of wire spring clip 66 is pressed centrifugally against guide pawls 57*a* of spring holder 57 aligned therealong, radial end portion 66*b* of wire spring clip 66 is pressed against both housing pin 40*a* and pressure pawl 57*e* of spring holder 57, and radial end portion 66*c* of wire spring clip 66 is pressed against both housing pin 40*b* and pressure pawl 57*f* of spring holder 57, so that wire spring clip 66 is compressed so as to have a gap g3 between radial end portions 66*b* and 66*c* of wire spring clip 66. Gap g3 is narrower than an essential gap between radial end portions 66*b* and 66*c* when wire spring clip 66 is free from the compression by spring holder 57. In other words, in the initial state of wire spring clip 66 fitted to spring holder 57, wire spring clip 66 functions as a compression spring.

Therefore, compressed wire spring clip 66 has tangent end portions 66*d* and 66*e* abutting against the outer circumferential surface of left end ring 5*q* of cage 5 so as to bias cage 5 centripetally against the relative rotation of clutch housing 4 and cage 5. In this way, wire spring clip 66 serves as a spring interposed between clutch housing 4 and cage 5 so as to be elastically transformable according to rotation of cage 5 relative to clutch housing 4.

Figure 6B:
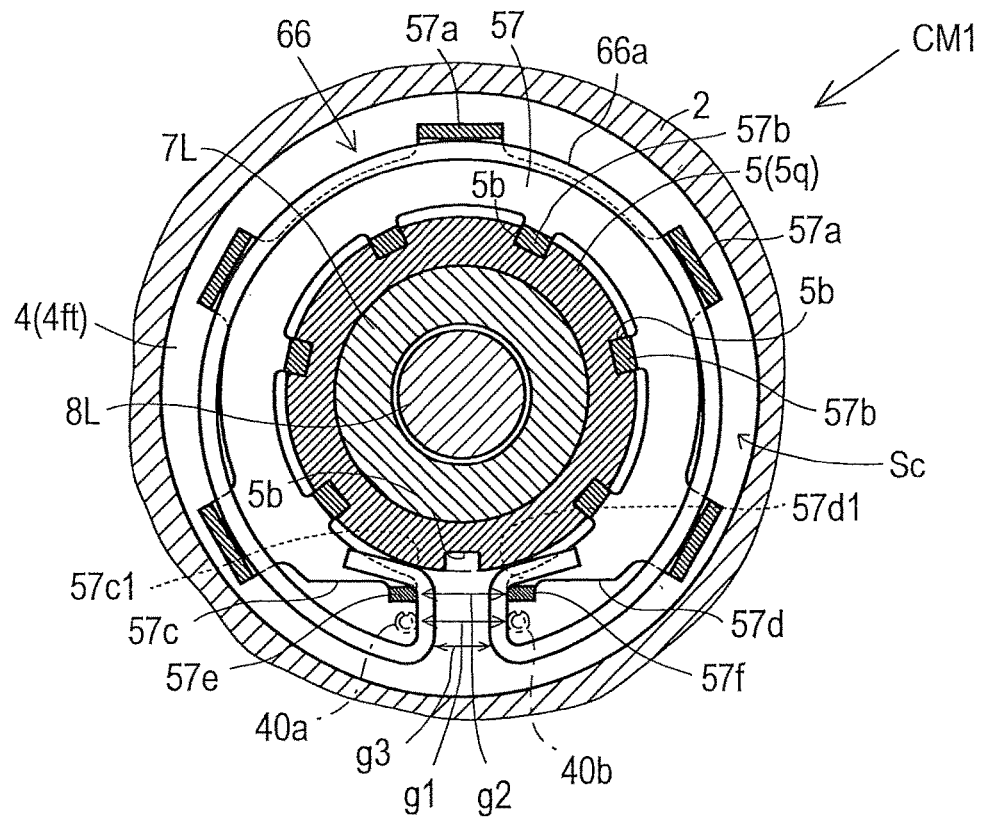
FIG. 6B is a cross sectional view taken along B-B line of FIG. 4 showing clutch-off biasing mechanism CM1 when bi-directional overrunning clutch CL is disengaged.

During traveling of vehicle 100, regardless of whether it travels forward or backward, as far as the rotary speed of right and left front wheels 10R and 10L rotated to follow rotation of rear wheels 18R and 18L is kept sufficient to keep the rotation speed of hubs 7 exceeding to the rotary speed of clutch housing 4, bi-directional overrunning clutch CL is disengaged (i.e., clutched off) as shown in FIG. 6A. During the clutch-off state of bi-directional overrunning clutch CL such as shown in FIG. 6, where rollers 6 are located at their initial positions defined by respective deepest center portions 4*c* of recesses 4*b* of clutch housing 4, regardless of whether clutch housing 4 (together with bevel ring gear 3 and input shaft 12) is rotated normally or reversely, the position of spring holder 57 fixedly engaged to cage 5 relative to clutch housing 4 is kept so as to keep pressure pawl 57*e* of spring holder 57 at the angle between radial end portion 66*b* and tangent end portion 66*d* of wire spring clip 66, and so as to keep pressure pawl 57*f* of spring holder 57 at the angle between radial end portion 66*c* and tangent end portion 66*e* of wire spring clip 66, thereby keeping the initially set maximum width of gap g3, as shown in FIG. 6B.

This state of clutch-off biasing mechanism CM1 corresponding to the clutch-off state of bi-directional overrunning clutch CL, where rollers 6 are disposed at their initial positions defined by deepest center portions 4*c* of clutch housing 4, is defined as an initial state of clutch-off biasing mechanism CM1. In the initial state of clutch-off biasing mechanism CM1, crosscut edges 57*c* and 57*d* of spring holder 57 are disposed substantially perpendicular to radial end portions 66*b* and 66*c* of wire spring clip 66.

As either right or left front wheel 10R or 10L is loaded to reduce its rotary speed, cage 5 receiving a frictional resistance from friction mechanism FM follows the speed reduction of hub 7R or 7L corresponding to loaded front wheel 10R or 10L via rollers 6L or 6R so as to rotate relative to clutch housing 4. As cage 5 rotates relative to clutch housing 4, spring holder 57 engaged to cage 5 via engagement pawls 57b rotates together with cage 5 so as to incline crosscut edges 57c and 57d from the initial position where they are extended perpendicular to radial end portions 66b and 66c of wire spring clip 66, while constant gap g2 between pressure pawls 57e and 57f at ends 57c1 and 57d1 of crosscut edges 57c and 57d is kept. The inclination of crosscut edges 57c and 57d causes one of pressure pawls 57e and 57f to push corresponding radial end portion 66b or 66c so as to generate a biasing force to return cage 5 to its initial position relative to clutch housing 4. However, until the rotation degree of cage 5 relative to clutch housing 4 reaches angle R (see FIG. 7A), rollers 6 are separated from sloped surfaces 4d of recesses 4b of clutch housing 4, thereby keeping the clutch-off state of bi-directional overrunning clutch CL.

Referring to FIG. 7A, as mentioned above, when the rotation degree of cage 5 relative to clutch housing 4 reaches angle R, bi-directional overrunning clutch CL is clutched on. In the clutch-on state of bi-directional overrunning clutch CL, rollers 6 are wedged-like engaged to clutch housing 4. Wedge-like engaged rollers 6 are pressed between clutch housing 4 and hub 7 by a torque in one of opposite rotational directions caused by the relative rotation of cage 5 to clutch housing 4. Therefore, a force to push rollers 6 in the other of the opposite rotational directions against the torque is required to smoothly release rollers 6 from the wedged-like engagement as soon as loaded front wheel 10R or 10L is unloaded.

Figure 7B:
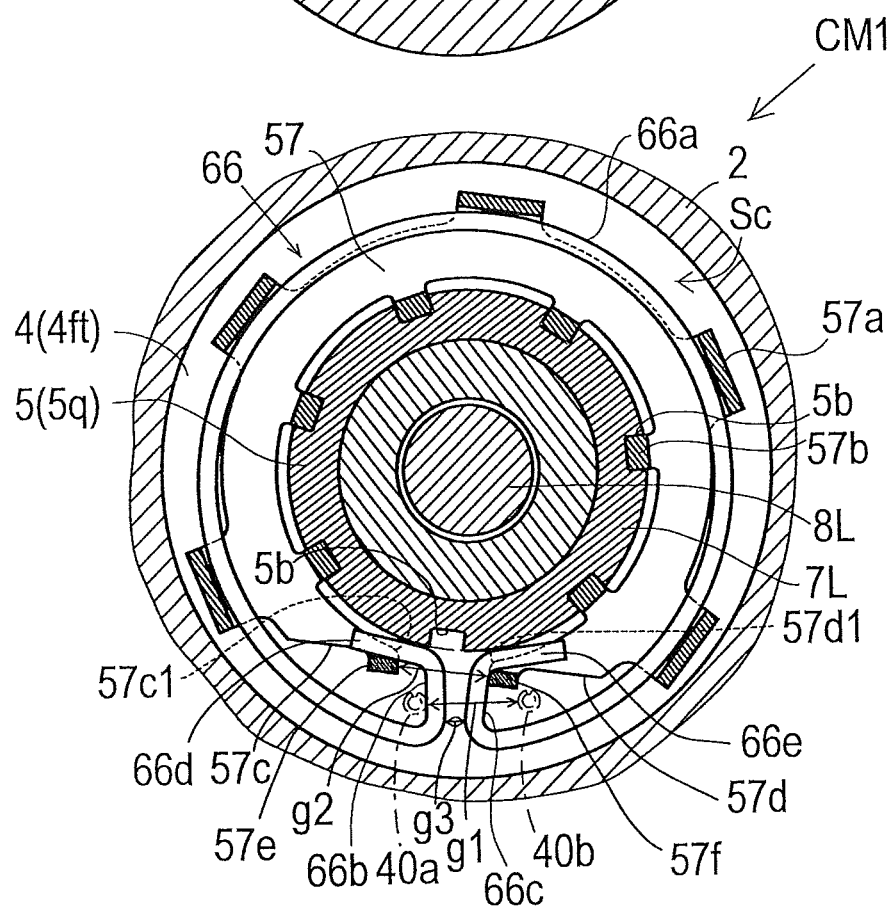
FIG. 7B is a cross sectional view taken along B-B line of FIG. 4 showing clutch-off biasing mechanism CM1 when bi-directional overrunning clutch CL is engaged.

In this regard, when bi-directional overrunning clutch CL is clutched on as shown in FIG. 7A, clutch-off biasing mechanism CM1 is set in a clutch-off biasing state as shown in FIG. 7B. In clutch-off biasing mechanism CM1 set in the clutch-off biasing state, one of pressure pawls 57e and 57f pushes corresponding radial end portion 66b or 66c away from corresponding housing pin 40a or 40b. Which of pressure pawls 57e and 57f pushes corresponding radial end portion 66b or 66c depends on whether cage 5 rotates clockwise or counterclockwise relative to clutch housing 4, i.e., whether clutch housing 4 is rotated in the normal direction or the reverse direction.

Here, pressure pawl 57f is assumed to push radial end portion 66c, as shown in FIG. 7B. While pressure pawl 57f pushes radial end portion 66c away from housing pin 40b, radial end portion 66b is held at its initial position by housing pin 40a. Incidentally, pressure pawl 57e moves away from radial end portion 66c as pressure pawl 57f pushes radial end portion 66d. The movement of pressure pawl 57e does not influence radial end portion 66c held by housing pin 40a. Therefore, radial end portion 66c pushed by pressure pawl 57f approaches radial end portion 66b held by housing pin 40a so as to narrow gap g3, i.e., so as to reduce the width of gap g3 between radial end portions 66b and 66c.

Wire spring clip 66 having narrowed gap g3 has been further compressed to bias spring holder 57 to the initial position of spring holder 57 relative to clutch housing 4. Therefore, once bi-directional overrunning clutch CL is released from the load causing the torque that has wedged-like engaged rollers 6 to clutch housing 4, clutch-off biasing mechanism CM1 functions to quickly disengage bi-directional overrunning clutch CL by the biasing force of wire spring clip 66 applied to cage 5 via spring holder 57.

As mentioned above, auxiliary transaxle 1 comprises transaxle casing 2, bi-directional overrunning clutch CL, friction mechanism FM, and clutch-off biasing mechanism CM1. Bi-directional overrunning clutch CL is disposed in transaxle casing 2. Bi-directional overrunning clutch CL includes clutch housing 4 serving as the input member, hubs 7 serving as the output member, cylindrical cage 5, and rollers 6. Clutch housing 4 is journalled by transaxle casing 2. Hubs 7 are journalled by transaxle casing 2 and coaxially surrounded by clutch housing 4. Clutch housing 4 and hubs 7 have the annular space between the inner circumferential surface of clutch housing 4, including sloped surfaces 4d of recesses 4b and radially inward ends of minimum diametric portions 4a, and the outer circumferential surfaces of hubs 7. The inner circumferential surface of clutch housing 4 includes wedge portions 4d1 aligned in the circumferential direction of clutch housing 4, and includes recesses 4b whose center portions including deepest center portions 4c between wedge portions 4d1 serve as radially expanded portions that are diametrically larger than wedge portions 4d1. Cage 5 is disposed coaxially to clutch housing 4 and hubs 7 in the annular space. Cage 5 has right and left end portions opposite each other in the axial direction of hubs 7. Rollers 6 are carried by cage 5 and contact the outer circumferential surface of hub 7 rotatably following rotation of hubs 7.

Bi-directional overrunning clutch CL is automatically shifted between its disengagement state where rollers 6 are disposed at the respective radially expanded portions of clutch housing 4 and are separated from respective wedge portions 4d1, and its engagement state where rollers 6 contact respective wedge portions 4d1. The shift of the bi-directional overrunning clutch CL depends on change of rotary speed difference between clutch housing 4 and hubs 7.

Friction mechanism FM applies a frictional force to cage 5 so as to enable cage 5 to rotate relative to clutch housing 4 according to the rotation of rollers 6 following hub 7. Clutch-off biasing mechanism CM1 biases cage 5 in the direction to disengage bi-directional overrunning clutch CL. Friction mechanism FM and clutch-off biasing mechanism CM1 are distributed so that friction mechanism FM is disposed at one (in this embodiment, right) of the right and left end portions of cage 5, and clutch-off biasing mechanism CM1 is disposed at the other (in this embodiment, left) of the right and left end portions of cage 5.

Figure 24:
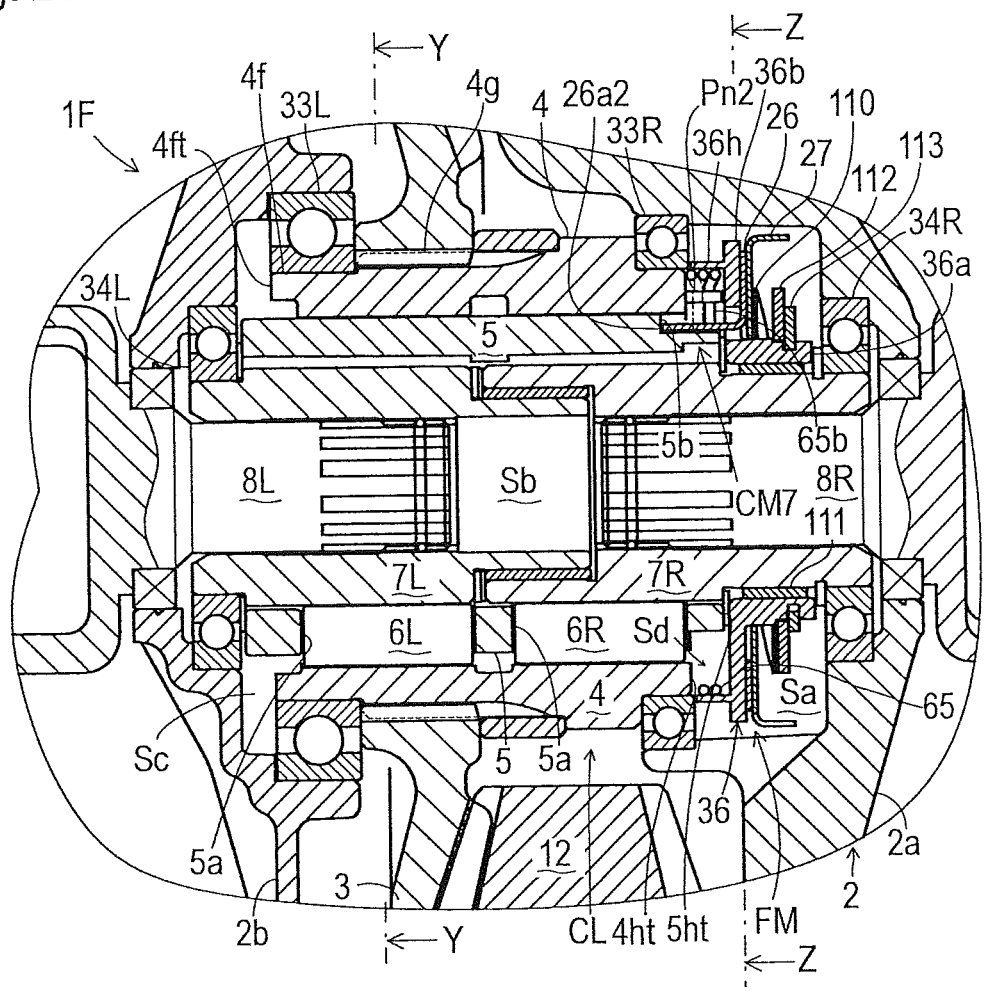
FIG. 24 is a fragmentary sectional plan view of a transaxle according to a seventh embodiment, incorporating bi-directional overrunning clutch CL, friction mechanism FM, and a clutch-off biasing mechanism CM7.
Figure 25:
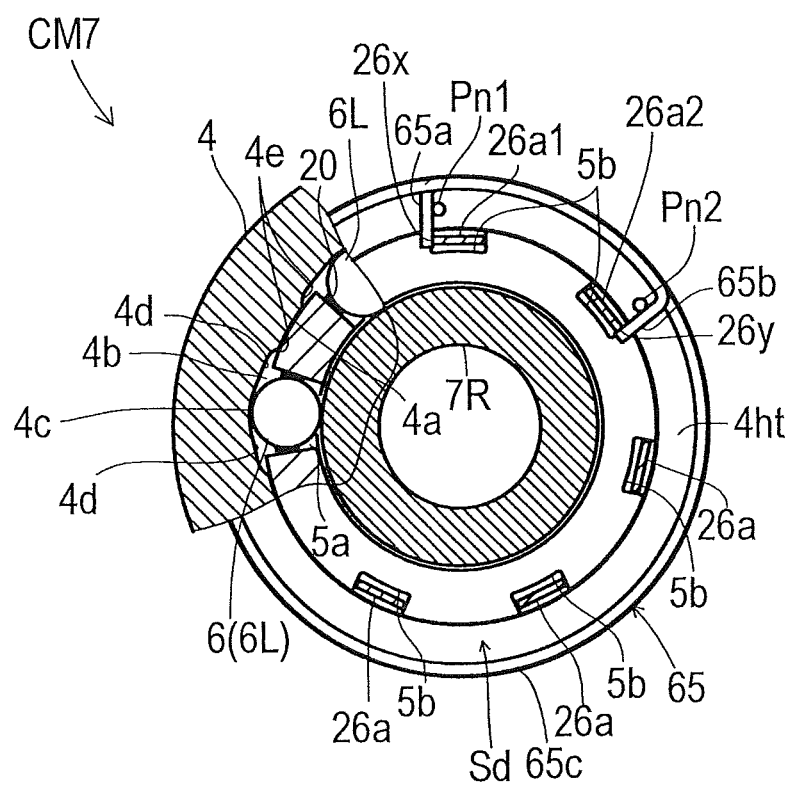
FIG. 25 is a cross sectional view taken along Y-Y line of FIG. 24 showing clutch-off biasing mechanism CM7, partly illustrating bi-directional overrunning clutch CL as a fragmentary cross sectional view taken along X-X line of FIG. 24.

Therefore, due to the distribution of friction mechanism FM and clutch-off biasing mechanism CM1 at the right and left end portions of cage 5 opposite each other in the axial direction of hubs 7, auxiliary transaxle 1 is advantageous in simplifying each of friction mechanism FM and clutch-off biasing mechanism CM1 so as to reduce labors for assembling auxiliary transaxle 1, in comparison with an imaginary case where friction mechanism FM and clutch-off biasing mechanism CM1 are complicatedly assembled with each other and are concentrated at one end portion of cage 5 in the axial direction of hubs 7 (see FIGS. 24 and 25).

Further, due to the distribution of friction mechanism FM and clutch-off biasing mechanism CM1 at the right and left end portions of cage 5 opposite each other in the axial direction of hubs 7, auxiliary transaxle 1 is advantageous in lightening respective portions of auxiliary transaxle 1 at the right and left sides in transaxle casing 2 (i.e., main housing 2a and side cover 2b) so as to economically ensure durability of the transaxle, in comparison with an imaginary case where friction mechanism FM and clutch-off biasing mechanism CM1 are concentrated at one end portion of cage 5 in the axial direction of hubs 7 so as to stress a portion of auxiliary transaxle 1 around the end portion of cage 5 and so as to require costs for strengthening the portion of auxiliary transaxle 1 to ensure required durability of auxiliary transaxle 1 (see FIGS. 24 and 25).

Clutch-off biasing mechanism CM1 includes wire spring clip 66, serving as a spring, interposed between clutch housing 4, serving as the input member, and cage 5 so as to be elastically transformable according to the rotation of cage 5 relative to clutch housing 4, thereby biasing cage 5 to the initial rotational position relative to clutch housing 4.

Clutch housing 4 is provided with housing pins 40*a* and 40*b* serving as engagement members that are rotatable integrally with clutch housing 4. Cage 5 is provided with engagement pawls 57*e* and 57*f* that are rotatable integrally with cage 5. Wire spring clip 66 is a compression spring, including elastic looped portion 66*a* that is able to expand and contract in the radial direction thereof, and including radial end portions 66*b* and 66*c* extended in the same radial direction, i.e., radially inward, from looped portion 66*a*. Radial end portions 66*b* and 66*c* of wire spring clip 66 are disposed between housing pins 40*a* and 40*b* and between engagement pawls 57*e* and 57*f*. When cage 5 is disposed at its initial rotational position relative to clutch housing 4 to disengage bi-directional overrunning clutch CL, engagement pawls 57*e* and 57*f* are aligned with respective housing pins 40*a* and 40*b* on respective radial lines, when viewed in the axial direction of clutch housing 4 and cage 5, so that end portion 66*b* of wire spring clip 66 is engaged to housing pin 40*a* and engagement pawl 57*e*, and radial end portion 66*c* of wire spring clip 66 is engaged to housing pin 40*b* and engagement pawl 57*f*. During rotation of cage 5 relative to clutch housing 4 from the initial rotational position until bi-directional overrunning clutch CL is engaged, engagement pawls 57*e* and 57*f* are offset from housing pins 40*a* and 40*b* in the circumferential direction of clutch housing 4 and cage 5 so that one of radial end potions 66*b* and 66*c* of wire spring slip 66 is engaged to either housing pin 40*a* or 40*b*, and the other of end portions 66*b* and 66*c* of wire spring clip 66 is engaged to either engagement pawl 57*e* or 57*f*.

In auxiliary transaxle 1, cage 5 is provided with spring holder 57 supporting elastic looped portion 66*a* of wire spring clip 66 between radial end portions 66*b* and 66*c* of wire spring clip 66. Spring holder 57 includes engagement pawls 57*e* and 57*f* to engage to radial end portions 66*b* and 66*c* of wire spring clip 66. Spring holder 57 is engaged to the left end portion of cage 5 rotatably integrally with cage 5.

Therefore, due to auxiliary transaxle 1 including clutch-off biasing mechanism CM1, the wedged-like engagement can be quickly and smoothly canceled so as to quickly and smoothly shift bi-directional overrunning clutch CL from the clutch-on state to the clutch-off state. Therefore, vehicle 100 equipped with auxiliary transaxle 1 can be quickly and smoothly returned from the four-wheel drive state to the two-wheel drive state.

Further, since wire spring clip 66 has been already compressed slightly in the initial state of clutch-off biasing mechanism CM1 when cage 5 is disposed at its initial position relative to clutch housing 4, wire spring clip 66 starts to be elastically transformed to bias cage 5 to the initial position as soon as cage 5 starts to rotate relative to clutch housing 4 from the initial position, thereby preventing unexpected wedged-like engagement or the like. In other words, bi-directional overrunning clutch CL is prevented from being unexpectedly wedged-like engaged in the ondemand-off mode, i.e., is prevented from being accidentally engaged.

Figure 8:
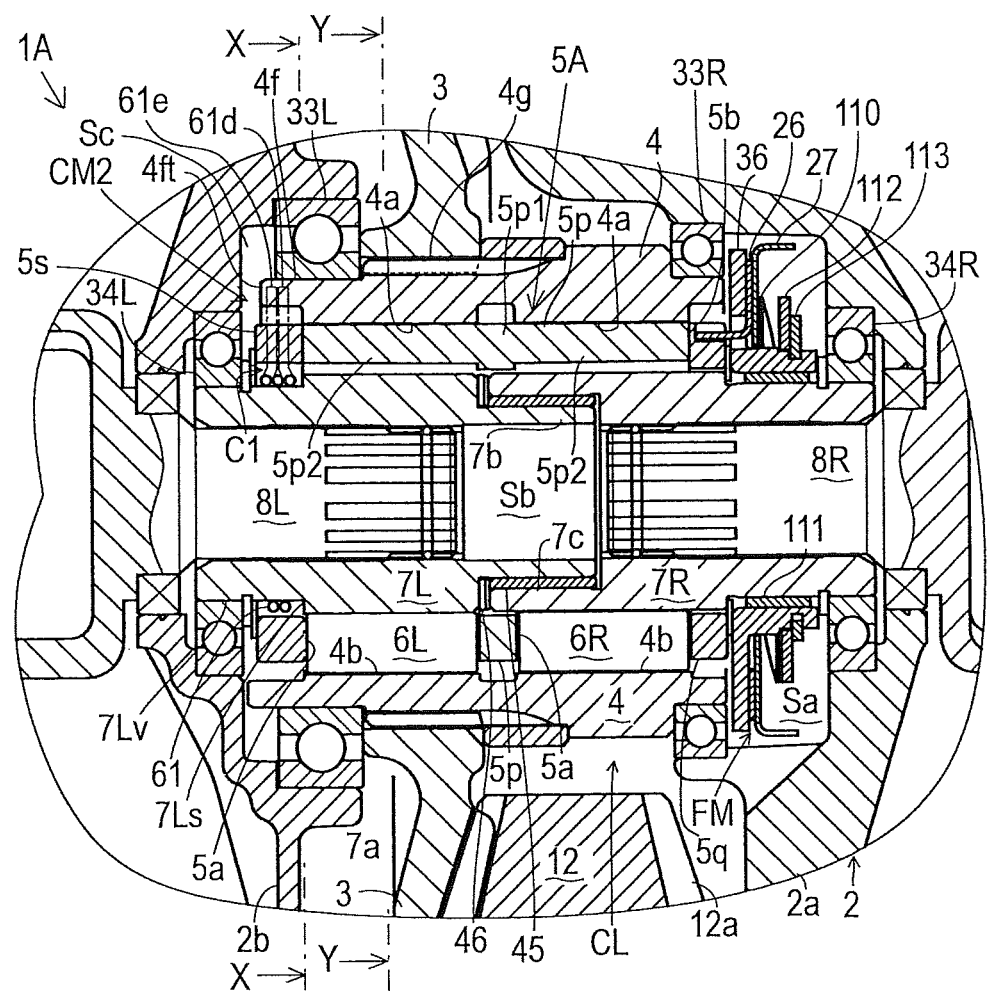
FIG. 8 is a fragmentary sectional plan view of a transaxle according to a second embodiment, incorporating bi-directional overrunning clutch CL, friction mechanism FM, and a clutch-off biasing mechanism CM2.
Figure 9:
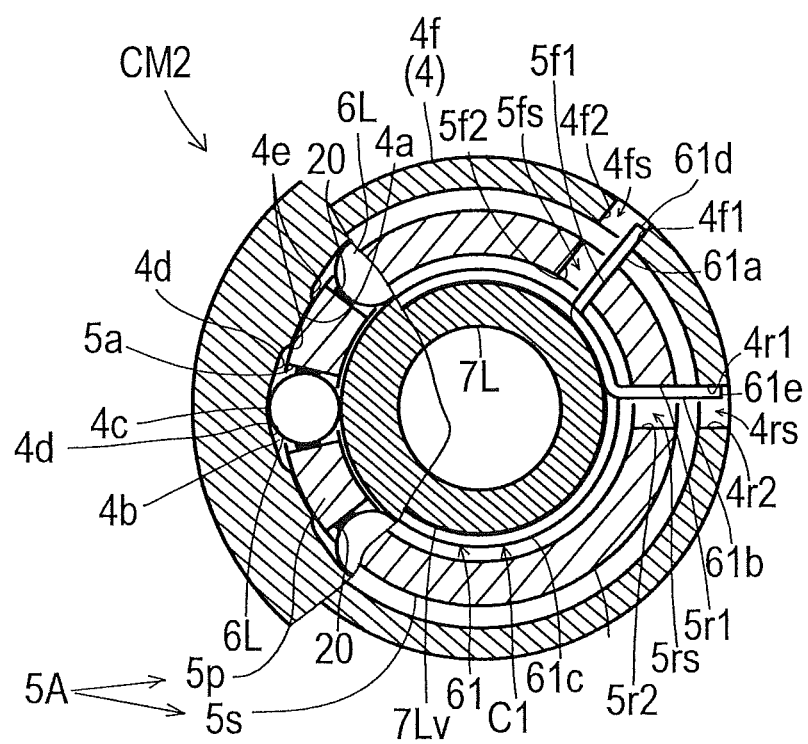
FIG. 9 is a cross sectional view taken along X-X line of FIG. 8 showing clutch-off biasing mechanism CM2, partly illustrating bi-directional overrunning clutch CL as a fragmentary cross sectional view taken along Y-Y line of FIG. 8.
Figure 10:
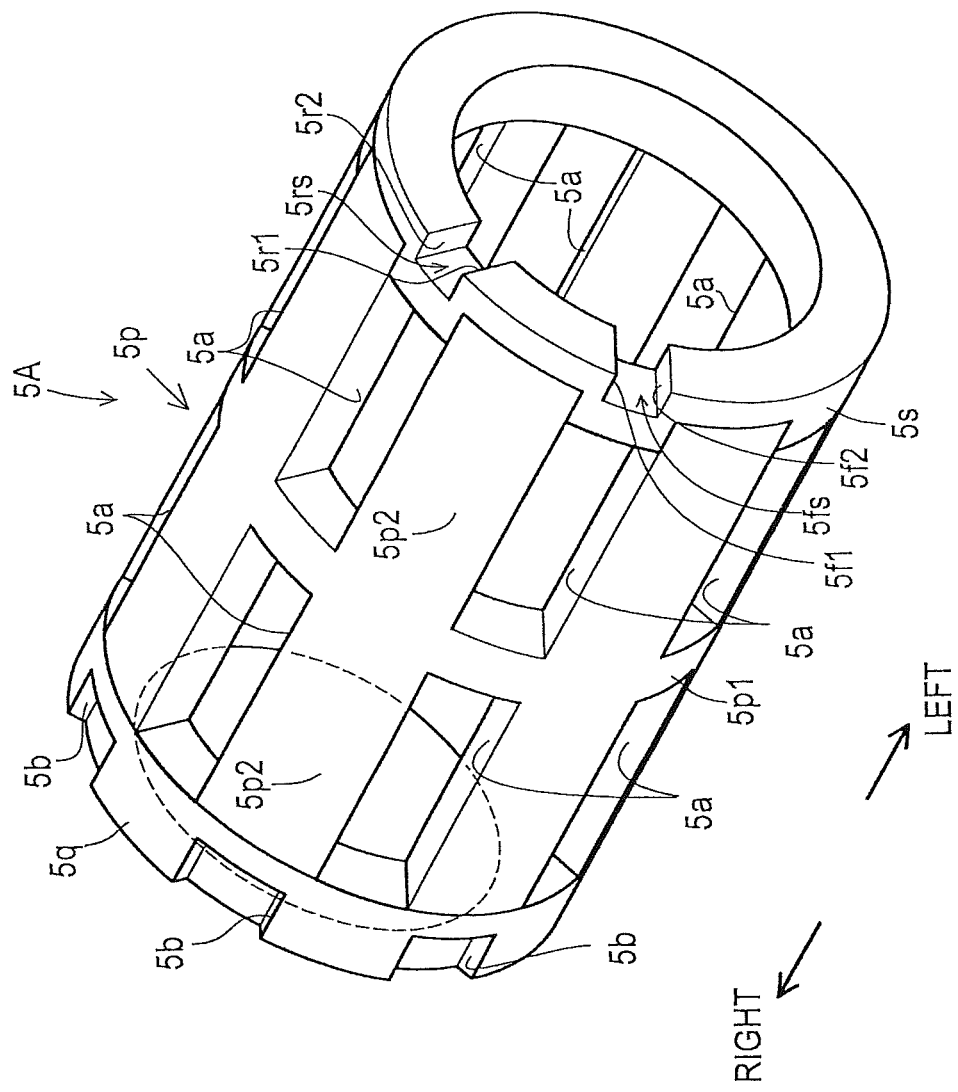
FIG. 10 is a perspective view of an alternative cage 5A used for the transaxle according to the second embodiment.

An alternative auxiliary transaxle 1A including bi-directional overrunning clutch CL provided with an alternative clutch-off biasing mechanism CM2 will be described with reference to FIGS. 8, 9 and 10. Hereinafter, structures functioning similar to those of auxiliary transaxle 1 will be designated by the same reference numerals, and description of the structures will be omitted. The same thing is adapted to later description of auxiliary transaxles 1B, 1C, 1D, 1E and 1F such as shown in FIGS. 11 to 25.

Auxiliary transaxle 1A includes clutch-off biasing mechanism CM2 disposed leftward in transaxle casing 2 opposite friction mechanism FM with respect to bi-directional overrunning clutch CL. Clutch-off biasing mechanism CM2 includes clutch housing 4, an alternative cage 5A, left hub 7L and a torsion spring 61.

In auxiliary transaxle 1A, left end portion 4*f* projecting leftward from splined outer circumferential portion 4*g* of clutch housing 4 is notched with two radial grooves 4*fs* and 4*rs* distant from each other at a predetermined angle along a circumferential direction thereof. Left end portion 4*f* of clutch housing 4 projects leftward from the left end of bearing 33L so that end surface 4*ft* as the left end of left end portion 4*f* is disposed in space Sc between bearings 33L and 34L in side cover 2*b*. Radial grooves 4*fs* and 4*rs* are open distally leftward on end surface 4*ft* of clutch housing 4 and radially inward and outward at inner and outer circumferential surfaces of left end portion 4*f* of clutch housing 4.

Bi-directional overrunning clutch CL of auxiliary transaxle 1A uses an alternative cage 5A. Cage 5A includes main part 5*p* similar to that of cage 5 for auxiliary transaxle 1. End ring 5*q* formed with grooves 5*b* corresponding to engagement pawls 26*a* of rotary-side friction plate 26 is fixed to the right end of main part 5*p* of cage 5A, similar to that of cage 5 for auxiliary transaxle 1. An alternative left end ring 5*sl* of cage 5A is notched by two radial grooves 5*fs* and 5*rs* distant from each other at a predetermined angle along the circumferential direction of cage 5A. Each of grooves 5*fs* and 5*rs* is open distally leftward at a left end surface of left end ring 5*s* of cage 5A, and is open radially outward and inward at outer and inner circumferential surfaces of left end ring 5*s* of cage 5A.

A center angle at the axis of cage 5A between grooves 5*fs* and 5*rs* is not more than 90 degrees, desirably, or 50 degrees, more desirably. The center angle between grooves 5*fs* and 5*rs* substantially coincides to a center angle at an axis of clutch housing 4 between notched grooves 4*fs* and 4*rs*. Grooves 5*fs* and 5*rs* of cage 5A correspond to respective grooves 4*fs* and 4*rs* of clutch housing 4 in location along the circumferential direction thereof. Grooves 5*fs* and 5*rs* serving as two steps of cage 5A and grooves 4*fs* and 4*rs* serving as two steps of clutch housing 4 are aligned along respective radial lines.

Alternatively, left end ring 5*s* of cage 5A and clutch housing 4 may be configured so that the center angle at the axis of cage 5A between grooves 5*fs* and 5*rs* and the center angle at the axis of clutch housing 4 between grooves 4*fs* and 4*rs* exceed 90 degrees and are substantially equal to 180 degrees.

Left hub 7L is radially stepped on an outer circumferential surface thereof so as to be formed with an annular vertical surface 7Ls. A left end portion 7Lv of left hub 7L extended leftward from annular vertical surface 7Ls has a diametrically smaller outer circumferential surface than the outer circumferential surface of the main part of left hub 7L extended rightward from annular vertical surface 7Ls to constitute bi-directional overrunning clutch CL.

A left half portion of the outer circumferential surface of left end portion 7Lv is fitted to the inner circumferential surface of bearing 34L, and a right half portion of the outer circumferential surface of left end portion 7Lv faces an inner circumferential surface of left end ring 5s of cage 5A, thereby ensuring a gap space C1 between the outer circumferential surface of left end portion 7Lv of left hub 7L and the inner circumferential surface of left end ring 5s of cage 5A and between bearing 34L and annular vertical surface 7Ls of left hub 7L.

Torsion spring 61 is made of elastic material such as steel, and includes a coiled portion 61c and two arm portions 61a and 61b. Arm portions 61a and 61b are pulled to cross over each other and are bent radially outward from coiled portion 61c. Torsion spring 61 is interposed between clutch housing 4 and cage 5. More specifically, coiled portion 61c is relatively rotatably coiled along the outer circumferential surface of left end portion 7Lv of left hub 7L in gap space C1. One arm portion 61a is passed through groove 5fs in left end ring 5s of cage 5A, and is fitted at an utmost end portion thereof into groove 4fs in left end portion 4f of clutch housing 4. The other arm portion 61b is passed through groove 5rs in left end ring 5s of cage 5A, and is fitted at an utmost end portion thereof into groove 4rs I left end portion 4f of clutch housing 4.

In the circumferential direction of clutch housing 4, radial groove 4fs has opposite end surfaces 4f1 and 4f2, and radial groove 4rs has opposite end surfaces 4r1 and 4r2. End surface 4f1 of radial groove 4fs is closer to radial groove 4rs than end surface 4f2 of radial groove 4fs. End surface 4r1 of radial groove 4rs is closer to radial groove 4fs than end surface 4r2 of radial groove 4rs. A circumferential gap between end surfaces 4f1 and 4f2 in radial groove 4fs and a circumferential gap between end surface 4r1 and 4r2 in radial groove 4rs are sufficient to ensure the rotatability of cage 5A relative clutch housing 4 in the respective opposite directions until rollers 6 abuts against wedge portions 4d1 of clutch housing 4.

In the circumferential direction of cage 5A, radial groove 5fs has opposite end surfaces 5f1 and 5f2, and radial groove 5rs has opposite end surfaces 5r1 and 5r2. End surface 5f1 of radial groove 5fs is closer to radial groove 5rs than end surface 5f2 of radial groove 5fs. End surface 5r1 of radial groove 5rs is closer to radial groove 5fs than end surface 5r2 of radial groove 5rs. A circumferential gap between end surfaces 5f1 and 5f2 in radial groove 5fs and a circumferential gap between end surface 5r1 and 5r2 in radial groove 5rs are sufficient to ensure the rotatability of cage 5A relative clutch housing 4 in the respective opposite directions until rollers 6 abuts against wedge portions 4d1 of clutch housing 4.

The center angle at the axis of clutch housing 4 between end surface 4f1 of radial groove 4fs and end surface 4r1 of radial groove 4rs, and the center angle at the axis of cage 5A between end surface 5f1 of radial groove 5fs and end surface 5r1 of radial groove 5rs, are slightly larger than a center angle of an axis of coiled portion 61c of torsion spring 61 between arm portions 61a and 61b when torsion spring 61 is free from either tension or compression force. Therefore, torsion spring 61 fitted to cage 5A and clutch housing 4 as mentioned above is slightly expanded to make the circumferential gap between arm portions 61a and 61b therebetween larger than the essential gap between arm portions 61a and 61b when torsion spring 61 is free from either tension or compression force.

Accordingly, in an initial state of clutch-off biasing mechanism CM2, torsion spring 61 serves as a tension spring having arm portions 61a and 61b slightly expanded to increase the gap therebetween so that arm portion 61a is pressed against end surface 5f1 of radial groove 5fs and end surface 4f1 of radial groove 4fs, and arm portion 61b is pressed against end surface 5r1 of radial groove 5rs and end surface 4r1 of radial groove 4rs. Therefore, torsion spring 61 starts to be elastically transformed to bias cage 5A to its initial position relative to clutch housing 4 as soon as a slight torque occurs to rotate cage 5A relative to clutch housing 4.

As cage 5A rotates relative to clutch housing 4 from its initial position relative to clutch housing 4 until rollers 6 abuts against wedge portions 4d1 of clutch housing 4, one arm portion 61a or 61b of torsion spring 61 is pushed away from end surface 4f1 or 4r1 of corresponding radial groove 4fs or 4rs by cage 5A, i.e., end surface 5f1 or 5r1 of corresponding radial groove 5fs or 5rs, while the other arm portion 61a or 61b of torsion spring 61 is still pressed against end surface 4f1 or 4r1 of corresponding radial groove 4fs or 4rs. Therefore, torsion spring 66 is elastically transformed so that the circumferential gap between arm portions 61a and 61b of torsion spring 61 is increased to increase the spring force of torsion spring 61 to bias cage 5A to its initial position relative to clutch housing 4.

Which of arm portions 61a and 61b is pushed by cage 5A depends on whether cage 5A rotates clockwise or counterclockwise relative to clutch housing 4, i.e., whether the rotation direction of clutch housing 4 receiving power from PTO shaft 15 via input shaft 12 and bevel ring gear 3 is normal or reverse.

As mentioned above, in auxiliary transaxle 1A, friction mechanism FM and clutch-off biasing mechanism CM2 are distributed so that friction mechanism FM is disposed at one (in this embodiment, right) end portion of cage 5A, and clutch-off biasing mechanism CM2 is disposed at the other (in this embodiment, left) end portion of cage 5A.

Therefore, auxiliary transaxle 1A including clutch-off biasing mechanism CM2 brings the effects similar to those of auxiliary transaxle 1.

Clutch-off biasing mechanism CM2 includes torsion spring 61 interposed between clutch housing 4 and cage 5A so as to be elastically transformable according to the rotation of cage 5A relative to clutch housing 4, thereby biasing cage 5A to the initial rotational position relative to clutch housing 4.

In clutch-off biasing mechanism CM2, clutch housing 4 is provided with end surfaces 4f1 and 4r1 that are rotatable integrally with clutch housing 4. Cage 5A is provided with end surfaces 5f1 and 5r1 that are rotatable integrally with cage 5A. Arm portions 61a and 61b serving as end portions of torsion spring 61 are pulled to cross over each other and have end surfaces 5f1, 5r1, 4f1 and 4r1 therebetween. When cage 5A is disposed at its initial rotational position relative to clutch housing 4 to disengage bi-directional overrunning clutch CL, end surfaces 5f1 and 5r1 are aligned with respective end surfaces 4f1 and 4r1 on respective radial lines, when viewed in the axial direction of clutch housing 4 and cage 5A, so that arm portion 61a of torsion spring 61 contacts end surfaces 5f1 and 4f1, and arm portion 61b of torsion spring 61 contacts end surfaces 5r1 and 4r1. During rotation of cage 5A relative to clutch housing 4 from the initial rotational position until bi-directional overrunning clutch CL is engaged, end surfaces 5f1 and 5r1 are offset from end surfaces 4f1 and 4r1 in the circumferential direction of clutch housing 4 and cage 5A so that one of arm potions 61a and 61b of torsion spring 61 is engaged to either end surface 4*f*1 or 4*r*1, and the other of arm portions 61*a* and 61*b* of torsion spring 61 is engaged to either end surface 5*f*1 or 5*r*1.

Therefore, due to auxiliary transaxle 1A including clutch-off biasing mechanism CM2, the wedged-like engagement can be quickly and smoothly canceled so as to quickly and smoothly shift bi-directional overrunning clutch CL from the clutch-on state to the clutch-off state. Therefore, vehicle 100 equipped with auxiliary transaxle 1A can be quickly and smoothly returned from the four-wheel drive state to the two-wheel drive state.

Further, since torsion spring 61 has been already expanded slightly in the initial state of clutch-off biasing mechanism CM2 when cage 5A is disposed at its initial position relative to clutch housing 4, torsion spring 61 starts to be elastically transformed to bias cage 5 to the initial position as soon as cage 5A starts to rotate relative to clutch housing 4, thereby preventing unexpected wedged-like engagement or the like. In other words, bi-directional overrunning clutch CL is prevented from being unexpectedly wedged-like engaged even in the ondemand-off mode, i.e., is prevented from being accidentally engaged.

An auxiliary transaxle 1B including bi-directional overrunning clutch CL provided with an alternative clutch-off biasing mechanism CM3 will be described with reference to FIGS. 11 to 17.

Figure 11:
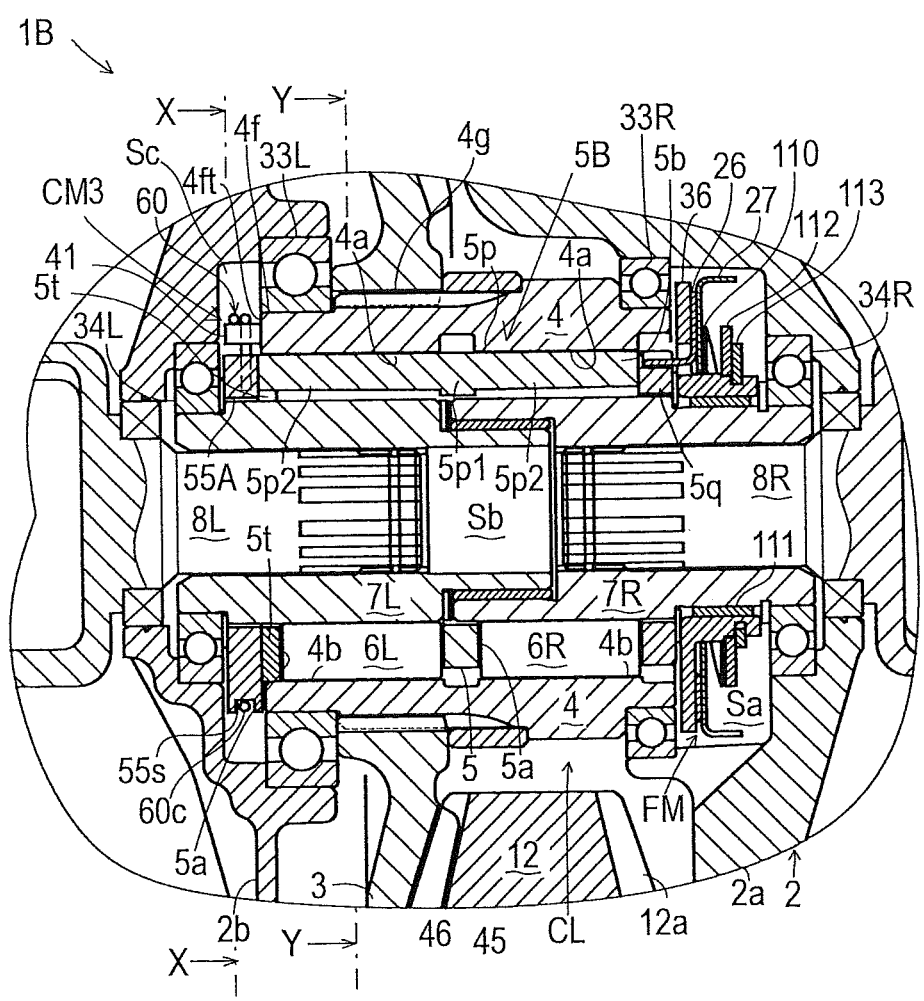
FIG. 11 is a fragmentary sectional plan view of a transaxle according to a third embodiment, incorporating bi-direc-tional overrunning clutch CL, friction mechanism FM, and a clutch-off biasing mechanism CM3 using a spring holder 55A.

Referring to FIG. 11, auxiliary transaxle 1B includes clutch-off biasing mechanism CM3 disposed leftward in transaxle casing 2 opposite friction mechanism FM with respect to bi-directional overrunning clutch CL. Clutch-off biasing mechanism CM3 includes clutch housing 4, an alternative cage 5B, left hub 7L and a torsion spring 60.

Torsion spring 60 made of elastic material such as steel is interposed via a spring holder 55A between clutch housing 4 and cage 5B to resist the rotation of cage 5B relative to clutch housing 4. Substantially discoid spring holder 55A is detachably attached around left hub 7L between the right end of bearing 34L and a left end of cage 5B.

Left end surface 4*ft* of clutch housing 4 and the left end of cage 5B substantially coincide to the left end of bearing 33L in location in the axial direction of output shafts 8, thereby ensuring space Sc between bearings 33L and 34L around spring holder 55A. In space Sc around spring holder 55A, a housing pin 41 projects axially leftward from left end surface 4*ft* of clutch housing 4. Housing pin 41 is formed integrally with clutch housing 4. Alternatively, housing pin 41 may be a pin separated from clutch housing 4 but fixed to clutch housing 4 so as to project leftward from left end surface 4*ft* of clutch housing 4.

Figure 13:
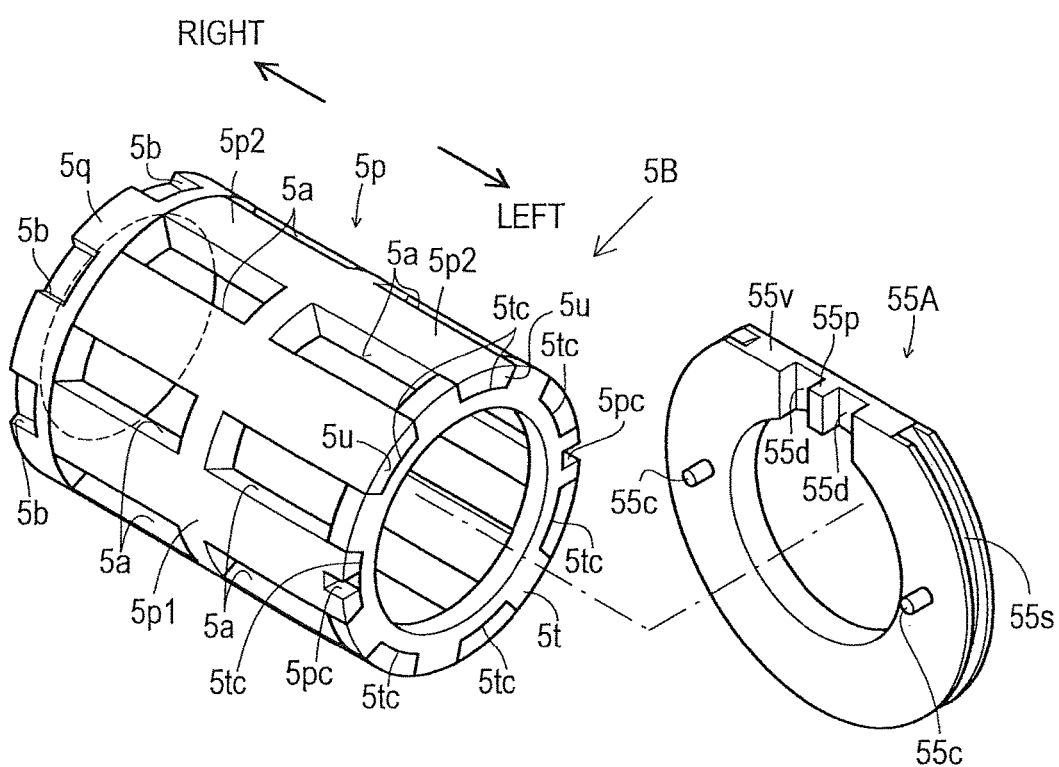
FIG. 13 is a perspective view of a cage 5B and spring holder 55 when they are disassembled.

Referring to FIG. 13, cage 5B includes main part 5*p* and right end ring 5*q*, similar to those of cage 5, and includes an alternative left end ring 51 placed at the left end of cage 5B. Left end ring 5*t* is fixed to main part 5*p* so as to have an outer circumferential surface continuing to the outer circumferential surface of main part 5*p*, and so as to have an inner circumferential surface continuing to the inner circumferential surface of main part 5*p*.

In this regard, left end ring 5*t* is notched by a plurality of recesses 5*tc* aligned along the circumferential surface thereof at regular interval. The number of recesses 5*tc* corresponds to that of roller holes 5*a* aligned circumferentially in the left half portion of main part 5*p*. Therefore, in this embodiment, left end ring 5*t* has seven recesses 5*tc*. Each recess 5*tc* is open distally leftward at the left end surface of left end ring 5*t*, proximally rightward at a right end surface of left end ring 5*t*, and radially outward at the outer circumferential surface of left end ring 5*t*, and is closed by an inner circumferential portion of left end ring 5*t* so as to form a recess-bottom circumferential surfaces having a smaller outer diameter than the maximum outer diameter of the outer circumferential surface of left end ring 5*t*.

Left end ring 5*t* fixed to main part 5*p* has the inner and outer circumferential surfaces continuous to the inner and outer circumferential surfaces of main part 5*p*. In this regard, a left end portion of each of left bridge portions 5*p*2 of main part 5*p* is formed as a radially thinned left end portion 5*u* (see FIGS. 16 and 17). Radially thinned left end portion 5*u* includes an outer circumferential surface continuous to the outer circumferential surface of the remaining part of main part 5*p*, and includes an inner circumferential surface is radially outwardly stepped to have an inner diameter that is larger than the minimum inner diameter of the inner circumferential surface of the remaining part of main part 5*p*.

Radially thinned left end portions 5*u* of left bridge portions 5*p*2 of main part 5*p* are fitted into respective recesses 5*tc* of left end ring 5*t*, so that the inner circumferential surfaces of radially thinned left end portions 5*u* are fitted onto the recess-bottom circumferential surfaces of respective recesses 5*tc*. Therefore, the inner circumferential surfaces of the main portions of left bridge portions 5*p*2 (extended rightward from radially thinned left end portion 5*u*) continue to the inner circumferential surface of left end ring 5*t*, and the outer circumferential surface of radially thinned left end portions 5*u* of left bridge portions 5*p*2 continue to the outer circumferential surface of left end ring 5*t*.

Further, left end surfaces of radially thinned left end portions 5*u* of left bridge portions 5*p*2 fitted in respective recesses 5*tc* continue to the left end surface of left end ring 5*t*. In other words, the left end surface of left end ring 5*t* fixed to main part 5*p* coincides to the left end surface of main part 5*p* in the axial direction of cage 5B, so that the left end of left end ring 5*t* and the left end of main part 5*p* serve as the left end of cage 5B, thereby ensuring the axial width of space Sc around left hub 7L between the left end of cage 5B and the right end of bearing 34L.

Two of left bridge portions 5*p*2 of main part 5*p* of cage 5B, which are radially opposite each other with respect to the axis of main part 5*p*, are notched at left ends thereof with respective pin grooves 5*tc* open radially outward and distally leftward at the left end of cage 5B.

Referring to FIG. 13, spring holder 55A has two vertical end surfaces axially opposite each other, one of the end surfaces is a distal left end surface of spring holder 55A, and the other of the end surfaces is a proximal right end surface of spring holder 55A. Two fixture pins 55*c* are fixed or formed on spring holder 55A so as to project axially rightward from the proximal right end surface of spring holder 55A. Fixture pins 55*c* are spaced from each other at 180 degrees on the circumference, i.e., are opposite each other with respective to an axis of discoid spring holder 55A. Fixture pins 55*c* are fitted into respective pin grooves 5*tc* of cage 5B so that spring holder 55A is detachably attached to cage 5B. Spring holder 55A attached to cage 5B is rotatable integrally with cage 5 and relative to clutch housing 4.

Figure 12:
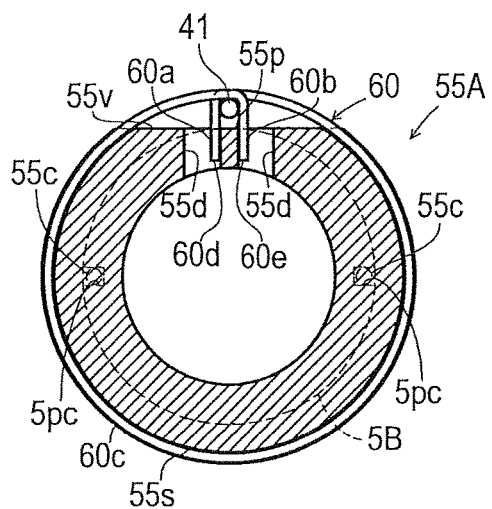
FIG. 12 is a cross sectional view taken along X-X line of FIG. 11 showing clutch-off biasing mechanism CM3 using spring holder 55A, partly illustrating bi-directional overrunning clutch CL as a fragmentary cross sectional view taken along Y-Y line of FIG. 11.

Discoid ring-shaped spring holder 55A has an outer circumferential edge between the distal left end surface and the proximal right end surface. The outer circumferential edge of spring holder 55A is formed circumferentially therealong with a spring groove 55*s*. Referring to FIG. 12, torsion spring 60 includes a coiled portion 60*c* similar to coiled portion 61*c* of torsion spring 61, and coiled portion 60*c* is fitted into spring groove 55*s*.

A part of the outer circumferential edge of spring holder 55A is chord-like cut off so as to form a flat edge surface 55v between the distal left end surface and the proximal right end surface. After spring holder 55A is attached to cage 5B, a center portion of flat edge surface 55v at the middle point between opposite ends thereof on the outer circumferential edge of spring holder 55A substantially coincides to a point on the outer circumferential surface of cage 5B in location in the radial direction of spring holder 55A and cage 5B. In other words, the outer circumferential edge of spring holder 55A, except for flat edge surface 55v, has a constant outer diameter that is greater than the outer diameter of cage 5B. A radial distance of flat edge surface 55v from the axis of spring holder 55A and cage 5B is reduced as it goes therealong from each of the opposite ends thereof to the center portion thereof, so that the radial distance becomes equal to the outer radius of cage 5B when it reaches the center portion of flat edge surface 55v.

On the other hand, an inner diameter of spring holder 55A is substantially equal to the inner diameter of cage 5B. In other words, spring holder 55A has an inner circumferential edge continuous to the inner circumferential surface of cage 5B.

Spring holder 55A is formed with two parallel slits 55d extended radially between flat edge surface 55v and the inner circumferential edge of spring holder 55A and open on the proximal right end surface thereof. Slits 55d may be replaced with holes closed at the proximal right end surface of spring holder 55A (see spring holder 56A shown in FIG. 16). The center portion of flat edge surface 55v, having a width equal to a diameter of housing pin 41, is disposed between open ends of respective slits 55d at flat edge surface 55v. Therefore, the proximal right end surface of spring holder 55A includes a radial linear portion, having the width equal to the diameter of housing pin 41, and extended radially inward from the center portion of flat edge surface 55v between parallel slits 55d. The radial linear portion between slits 55d is formed as a minimum diametric portion projecting proximally rightward from the axially deepest end of slits 55d so as to serve as a spring-pressure portion 55p.

Torsion spring 60 includes two arm portions 60a and 60b, which are pulled to cross over each other and are bent to extend radially inward from coiled portion 60c. Coiled portion 60c is fitted into spring groove 55s as mentioned above, so that torsion spring 60 is wound on the outer circumferential edge of spring holder 55A. In this state, arm portion 60a is disposed axially proximally from arm portion 60b. Two arm portions 60a and 60b are pulled along the circumferential direction of spring holder 55A, so as to cross over each other when viewed in the axial direction of spring holder 55A, thereby slightly compressing coiled portion 60c radially inward.

Arm portions 60a and 60b crossing over each other are disposed opposite each other with respect to housing pin 41 and spring-pressure portion 55p in the circumferential direction of spring holder 55A, and the radially inward extended portions of respective arm portions 60a and 60b are disposed in respective slits 55d. Arm portions 60a and 60b have respective utmost ends 60c and 60d disposed in respective slits 55d, thereby being prevented from projecting radially inward from the inner circumferential edge of spring holder 55A to be interfered with the outer circumferential surface of left hub 7L passed through the hole defined by the inner circumferential edge of spring holder 55A.

When cage 5B is disposed at the initial position relative to clutch housing 4, the center portion of flat edge surface 55v of spring holder 55A approaches closest to housing pin 41 so as to coincide to housing pin 41 in location in the circumferential direction of cage 5B and clutch housing 4. In other words, spring-pressure portion 55p defined by the center portion of flat edge surface 55v and housing pin 41 are aligned on a radial line extended from the axis of spring holder 55A. In this state, both arm portions 60a and 60b are hung at the respective bent portions thereof on housing pin 41, and are pressed against opposite surfaces of spring-pressure portion 55p in respective slits 55d at the respective portions thereof extended radially inward to respective ends 60c and 60d.

As cage 5B rotates relative to clutch housing 4 from the initial position, one of arm portions 60a and 60b is pushed by spring-pressure portion 55p of spring holder 55A fixed to cage 5B and is separated from housing pin 41, while the other of arm portion 60a and 60b is retained by housing pin 41 and is separated from spring-pressure portion 55p. Therefore, torsion spring 60 is elastically transformed so as to expand a gap between arm portions 60a and 60b in the circumferential direction of spring holder 55A, thereby biasing cage 5B to the initial position relative to clutch housing 4.

As mentioned above, in auxiliary transaxle 1B, friction mechanism FM and clutch-off biasing mechanism CM3 are distributed in transaxle casing 2 so that friction mechanism FM is disposed at one (in this embodiment, right) end portion of cage 5B, and clutch-off biasing mechanism CM3 is disposed at the other (in this embodiment, left) end portion of cage 5B.

Therefore, auxiliary transaxle 1B including clutch-off biasing mechanism CM3 brings the effects similar to those of auxiliary transaxles 1 and 1A.

Figure 14:
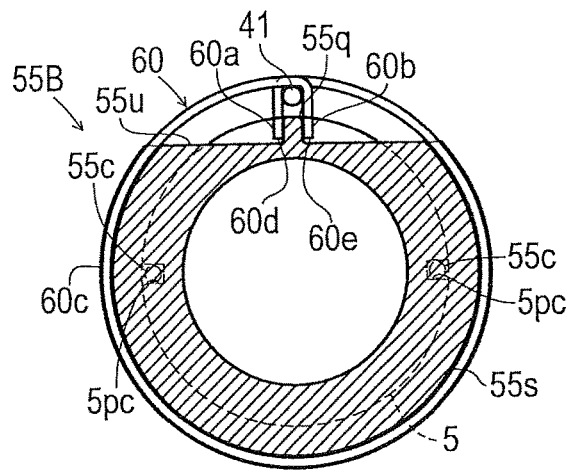
FIG. 14 is a cross sectional view taken along X-X line of FIG. 11 showing clutch-off biasing mechanism CM3 using an alternative spring holder 55B, partly illustrating bi-directional overrunning clutch CL as a fragmentary cross sectional view taken along Y-Y line of FIG. 11.
Figure 15:
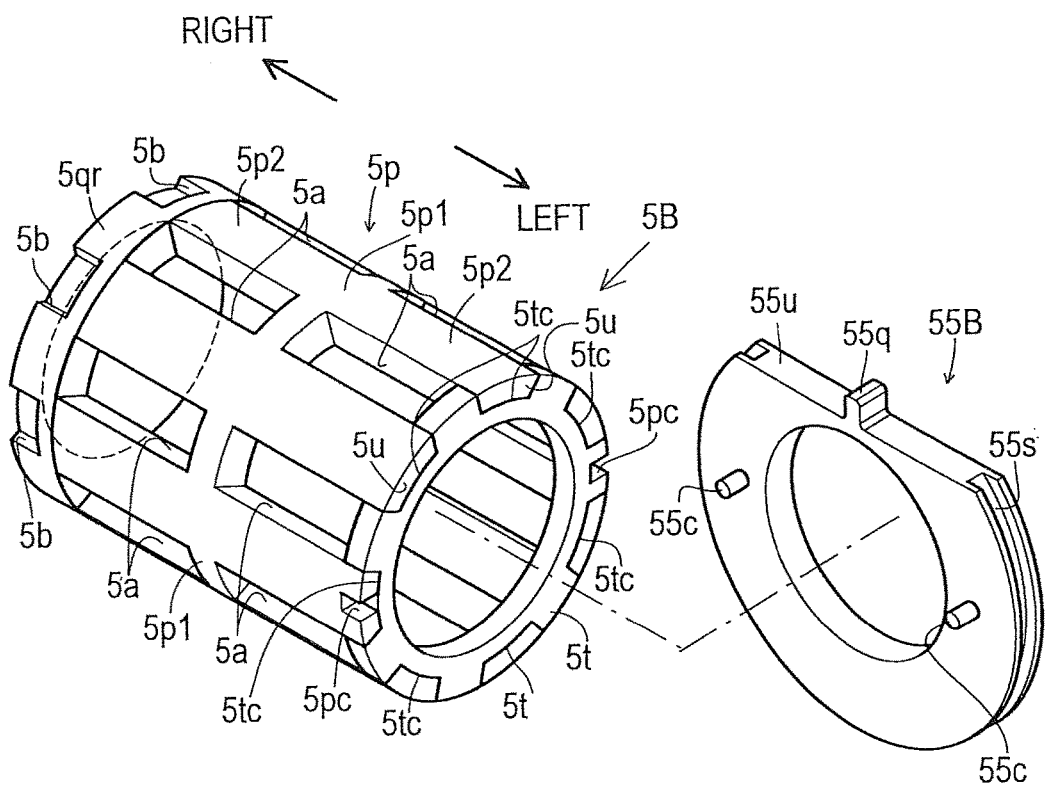
FIG. 15 is a perspective view of cage 5B and spring holder 55B when they are disassembled.

Referring to FIGS. 14 and 15, an alternative spring holder 55B may be detachably attached to cage 5B. Spring holder 55B attached to cage 5B is rotatable integrally with cage 5B and relative to clutch housing 4. Spring holder 55B is detachably attached to cage 5B by fitting fixture pins 55c into respective pin grooves 5tc of cage 5B, similar to spring holder 55A. Hereinafter, components similar to the above-mentioned components of spring holder 55A are designated by the same reference numerals, and description of the components is omitted.

Referring to FIG. 15, has two vertical end surfaces axially opposite each other, one of the end surfaces is a distal left end surface of spring holder 55B, and the other of the end surfaces is a proximal right end surface of spring holder 55B. Two fixture pins 55c project axially rightward from the proximal right end surface of spring holder 55B, similar to those of spring holder 55A.

Discoid ring-shaped spring holder 55B has an outer circumferential edge between the distal left end surface and the proximal right end surface. The outer circumferential edge of spring holder 55B is formed circumferentially therealong with spring groove 55s similar to that of spring holder 55A. Referring to FIG. 14, coiled portion 61c of torsion spring 61 is fitted into spring groove 55s.

A part of the outer circumferential edge of spring holder 55B is chord-like cut off so as to form a flat edge surface 55u between the distal left end surface and the proximal right end surface. A spring-pressure portion 55q projects radially outward from a center portion of flat edge surface 55u at the middle point between opposite ends of flat edge surface 55u on the outer circumferential edge of spring holder 55B. Circumferentially opposite end surfaces of spring-pressure portion 55q are extended radially of spring holder 55B, so as to have a width therebetween equal to the diameter of housing pin 41. Axially opposite end surfaces of spring-pressure portion 55q continue to the proximal and distal (right and left) end surfaces of spring holder 55B, so as to have a width therebetween equal to the width of flat edge surface 55u between the proximal and distal end surfaces of spring holder 55B.

After spring holder 55B is fixed to cage 5B, a radially utmost end of spring-pressure portion 55q substantially coincides to a point on the outer circumferential surface of cage 5B in location in the radial direction of spring holder 55B and cage 5B, while the outer circumferential edge of spring holder 55B, except for flat edge surface 55u, has a constant outer diameter that is greater than the outer diameter of cage 5B.

On the other hand, an inner diameter of spring holder 55B is substantially equal to the inner diameter of cage 5B, so that spring holder 55B has an inner circumferential edge continuous to the inner circumferential surface of cage 5B. The radially inward end of spring-pressure portion 55q defined as the center portion of flat edge surface 55u is disposed close to the inner circumferential edge of spring holder 55B, however, it is disposed radially outward from the inner circumferential edge of spring holder 55B.

Arm portions 60a and 60b of torsion spring 60 wound around spring holder 55B are pulled along the circumferential direction of spring holder 55B, so as to cross over each other when viewed in the axial direction of spring holder 55B, thereby slightly compressing coiled portion 60c radially inward. Arm portions 60a and 60b crossing over each other are disposed opposite each other with respect to housing pin 41 and spring-pressure portion 55q in the circumferential direction of spring holder 55B. Utmost ends 60c and 60d of respective arm portions 60a and 60b are disposed radially outward from flat edge surface 55u, thereby being prevented from being interfered with flat edge surface 55u of spring holder 55B and left hub 7L passed through the hole defined by the inner circumferential edge of spring holder 55B.

When cage 5B is disposed at the initial position relative to clutch housing 4, the radially utmost end of spring-pressure portion 55q approaches closest to housing pin 41 so as to coincide to housing pin 41 in location in the circumferential direction of cage 5B and clutch housing 4. In other words, spring-pressure portion 55q and housing pin 41 are aligned on a radial line extended from the axis of spring holder 55B. In this state, both arm portions 60a and 60b are hung at respective bent portions thereof on housing pin 41, and are pressed against the circumferentially opposite surfaces of spring-pressure portion 55q at the respective portions thereof extended radially inward to respective ends 60c and 60d.

As cage 5B rotates relative to clutch housing 4 from the initial position, one of arm portions 60a and 60b is pushed by spring-pressure portion 55q of spring holder 55B fixed to cage 5B and is separated from housing pin 41, while the other of arm portion 60a and 60b is retained by housing pin 41 and is separated from spring-pressure portion 55q. Therefore, torsion spring 60 is elastically transformed so as to expand a gap between arm portions 60a and 60b in the circumferential direction of spring holder 55B, thereby biasing cage 5B to the initial position relative to clutch housing 4.

Figure 16:
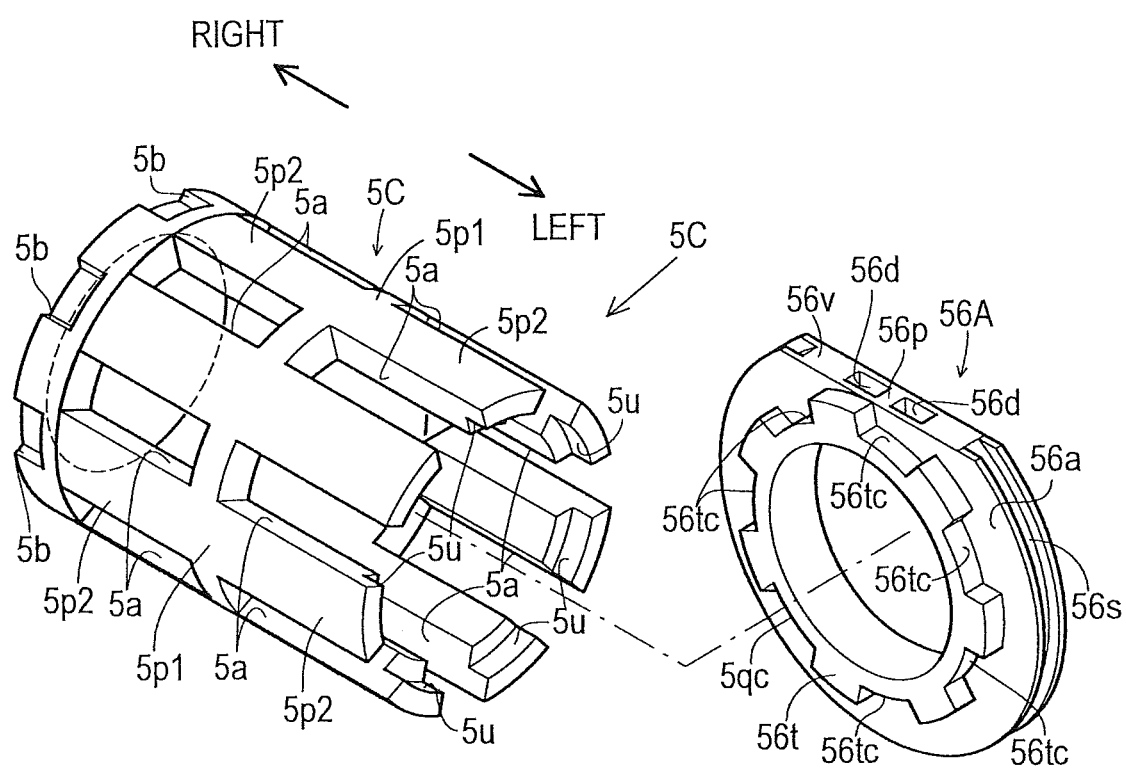
FIG. 16 is a perspective view of an alternative cage 5C and an alternative spring holder 56A when they are disassembled.
Figure 17:
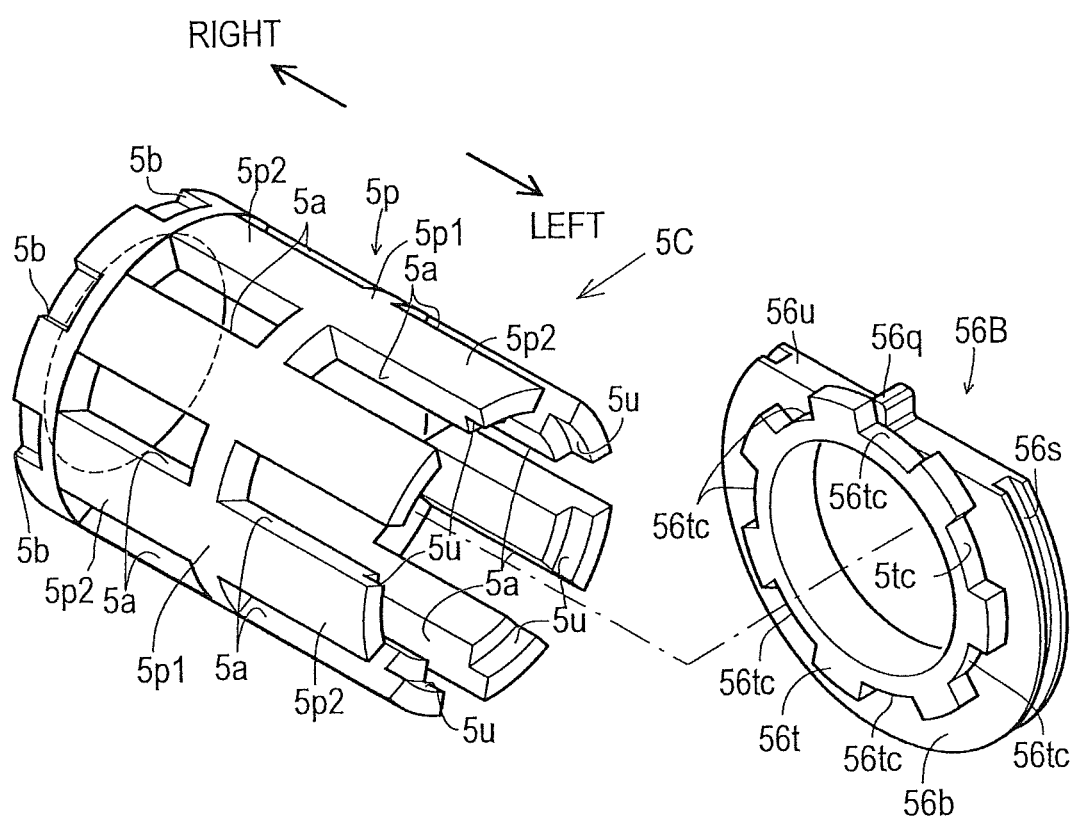
FIG. 17 is a perspective view of cage 5C and an alternative spring holder 56B when they are disassembled.

Referring to FIGS. 16 and 17, auxiliary transaxle 1B may use an alternative cage 5C so as to constitute clutch-off biasing mechanism CM3. In an embodiment shown in FIG. 16, an alternative spring holder 56A having the same function of as spring holder 55A also serves as an end ring of cage 5C. In an embodiment shown in FIG. 17, an alternative spring holder 56B having the same function of spring holder 55B also serves as an end ring of cage 5C. Hereinafter, structural features similar to above-mentioned structural features of cages 5, 5A and 5B are designated by the same reference numerals, and their description is omitted.

Referring to FIG. 16, spring holder 56A includes a discoid ring-shaped spring holder part 56a having an outer circumferential edge formed with a spring groove 56s, into which coiled portion 60c of torsion spring 60 is fitted. Spring holder part 56a is formed with a chord-like cut flat edge surface 56v, and is formed therein with a pair of radially extended holes 56d for accommodating arm portions 60a and 60b of torsion spring 60. Holes 56d have respective radially outer ends open at flat edge surface 56v, and a portion between holes 56d serves as a spring-pressure portion 56p. Therefore, spring holder part 56a of spring holder 56A is formed similar to spring holder 55A such as shown in FIG. 13 so as to have the same function as spring holder 55A.

Spring holder 56A includes end ring part 56t projecting proximally rightward from the proximal right end surface of spring holder part 56a. End ring part 56t is formed with recesses 56tc aligned along an outer circumferential surface thereof so as to correspond to radially thinned left end portions 5u of left bridge portions 5p2 of main part 5p. Therefore, end ring part 56t of spring holder 56A is formed similar to left end ring 5t of cage 5B such as shown in FIG. 13 so as to have the same function as left end ring 5t of cage 5B.

Spring holder 56A include end ring part 56t and spring holder part 56a formed integrally with each other. Alternatively, end ring part 56t and spring holder part 56a may be essentially individual members fixed to each other so as to be configured as spring holder 56A.

To constitute clutch-off biasing mechanism CM3 including cage 5C with spring holder 56A, cage 5C is completely provided with spring holder part 56a if only end ring part 56t is fitted to the left end of main part 5p by fitting radially thinned left end portions 5u of left bridge portions 5p2 of main part 5p into respective recesses 56tc of end ring part 56t of spring holder 56A. Therefore, labors for constituting clutch-off biasing mechanism CM3 are reduced in comparison with the afore embodiment shown in FIGS. 11 to 13, where fixture pins 55c of spring holder 55A must be inserted into grooves 5pc of main part 5p of cage 5B because spring holder 55A is separated from left end ring 5t of cage 5B.

Referring to FIG. 17, spring holder 56B includes a discoid ring-shaped spring holder part 56b having an outer circumferential edge formed with spring groove 56s. Spring holder part 56a is formed with a chord-like cut flat edge surface 56u, and is formed with a spring-pressure portion 56q projecting radially outward from a center portion of flat edge surface 56u. Therefore, spring holder part 56b of spring holder 56B is formed similar to spring holder 55B such as shown in FIG. 15 so as to have the same function as spring holder 55B.

Spring holder 56B includes end ring part 56t formed with recesses 56tc and projecting proximally rightward from the proximal right end surface of spring holder part 56b, similar to end ring part 56t of spring holder 56A. End ring part 56t is formed integrally with spring holder part 56b, or may be a member independent of spring holder part 56b but fixed to spring holder part 56b. Similar to the advantage of cage 5C with spring holder 56A, cage 5C with spring holder 56B is advantageous in reducing labors to constitute clutch-off biasing mechanism CM3 including cage 5C with spring holder 56B.

To constitute clutch-off biasing mechanism CM3 including cage 5C with spring holder 56A, cage 5C is completely provided with spring holder part 56a if only end ring part 56t is fitted to the left end of main part 5p by fitting radially thinned left end portions 5u of left bridge portions 5p2 of main part 5p into respective recesses 56tc of end ring part 56t of spring holder 56A. Therefore, labors for constituting clutch-off biasing mechanism CM3 are reduced in comparison with the afore embodiment shown in FIGS. 11 to 13, where fixture pins 55c of spring holder 55A must be inserted into grooves 5pc of main part 5p of cage 5B because spring holder 55A is separated from left end ring 51 of cage 5B.

As mentioned above, in clutch-off biasing mechanism CM3, clutch housing 4 serving as the input member is provided with housing pin 41 that is rotatable integrally with clutch housing 4. Cage 5B or 5C is provided with spring-pressure portion 55p, 55q, 56p or 56q that is rotatable integrally with cage 5B or 5C. Arm portions 60a and 60b, serving as a pair of end portions of torsion spring 60, are pulled to cross over each other and have both housing pin 41 and spring-pressure portion 55p, 55q, 56p or 56q therebetween. When cage 5A or 5B is disposed at the initial rotational position relative to clutch housing 4 to disengage bi-directional overrunning clutch CL, housing pin 41 and spring-pressure portion 55p, 55q, 56p or 56q are aligned on one radial line, when viewed in the axial direction of clutch housing 4 and cage 5B or 5C, so as to engage to both of arm portions 60a and 60b of torsion spring 60 respectively. During rotation of cage 5B or 5C relative to clutch housing 4 from the initial rotational position until bi-directional overrunning clutch CL is engaged, housing pin 41 and spring-pressure portion 55p, 55q, 56p or 56q are offset from each other in the circumferential direction of clutch housing 4 and cage 5B or 5C so that housing pin 41 engages to one of arm portions 60a and 60b of torsion spring 60, and spring-pressure portion 55p, 55q, 56p or 56q engages to the other of arm portions 60a and 60b of torsion spring 60.

In auxiliary transaxle 1B, cage 5B or 5C is provided with spring holder 55A, 55B, 56A or 56B supporting coiled portion 60c serving as an elastic looped portion of torsion spring 60 between arm portions 60a and 60b. Spring holder 55A, 55B, 56A or 56B includes spring-pressure portion 55p, 55q, 56p or 56q disposed between arm portions 60a and 60b of torsion spring 60. Spring holder 55A, 55B, 56A or 56B is engaged to the left end portion of cage 5B or 5C rotatably integrally with cage 5B or 5C.

Therefore, clutch-off biasing mechanism CM3 using either cage 5B or 5C and any one of spring holders 55A, 55B, 56A and 56B brings the effects to overrunning clutch CL in auxiliary transaxle 1B similar to the effects of clutch-off biasing mechanism CM1 or CM2 for overrunning clutch CL.

An auxiliary transaxle 1C will now be described with reference to FIGS. 18 and 19.

Auxiliary transaxle 1C includes a clutch-off biasing mechanism CM4 disposed opposite friction mechanism FM with respect to bi-directional overrunning clutch CL. Clutch-off biasing mechanism CM4 includes clutch housing 4, cage 5, left hub 7L and a torsion spring 62.

Incidentally, in the foresaid embodiments, each of cages 5 and 5A is defined as having a left end portion extended axially in space Sc between bearings 33L and 34L so as to have its utmost end surface close to the right and of bearing 34L while each of cages 5B and 5C is defined as being provided with spring holder 55A or 55B or spring holder part 56a or 56b between the left end thereof and the right end of bearing 34L. Auxiliary transaxle 1C and later-discussed auxiliary transaxles 1D, 1E and 1F have respective cages carrying rollers 6, and each of the cages has its utmost left end surface close to the right end of bearing 34L so as to have a left end portion axially extended in space Sc between bearings 33L and 34L Therefore, a presentative name "cage 5" is applied to the cages in auxiliary transaxles 1C, 1D, 1E and 1F, although the cages are modified to constitute respective clutch-off biasing mechanisms CM4, CM5, CM6 and CM7.

Figure 18:
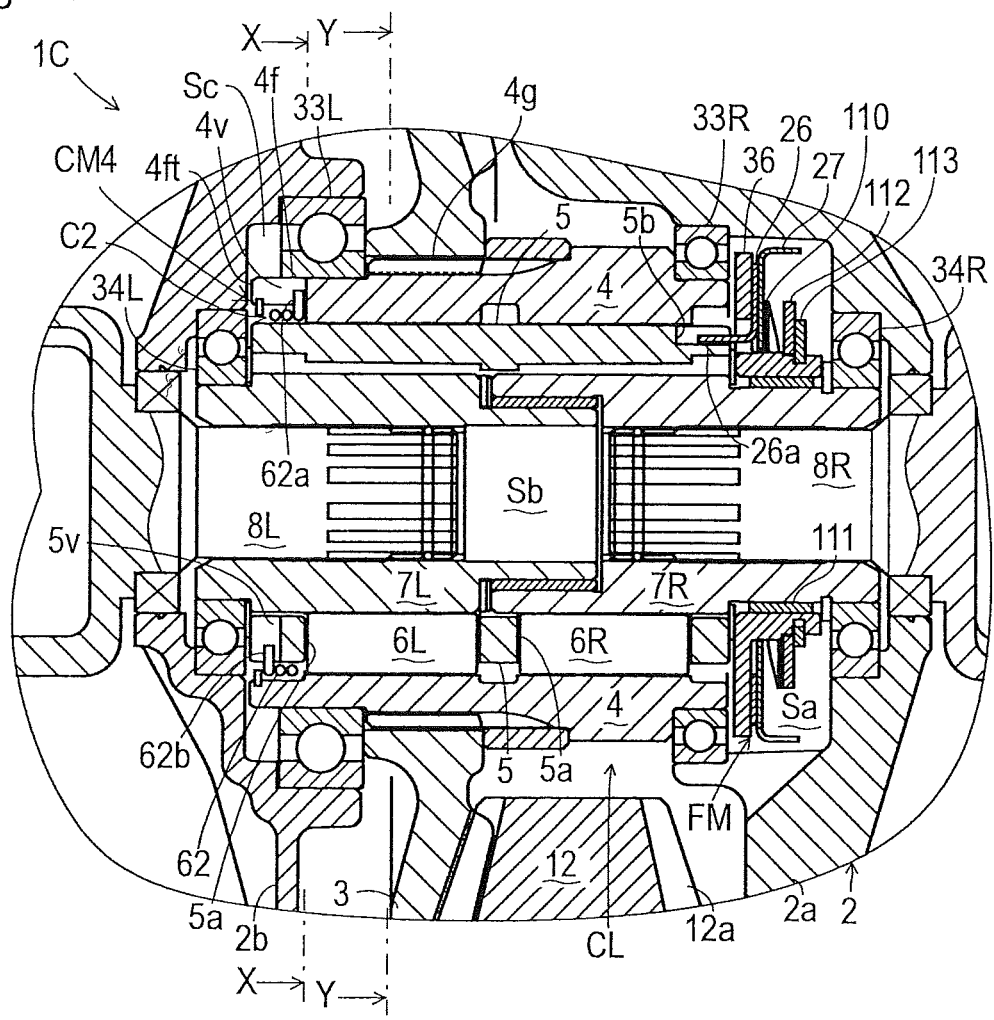
FIG. 18 is a fragmentary sectional plan view of a transaxle according to a fourth embodiment, incorporating bi-directional overrunning clutch CL, friction mechanism FM, and a clutch-off biasing mechanism CM4.
Figure 19:
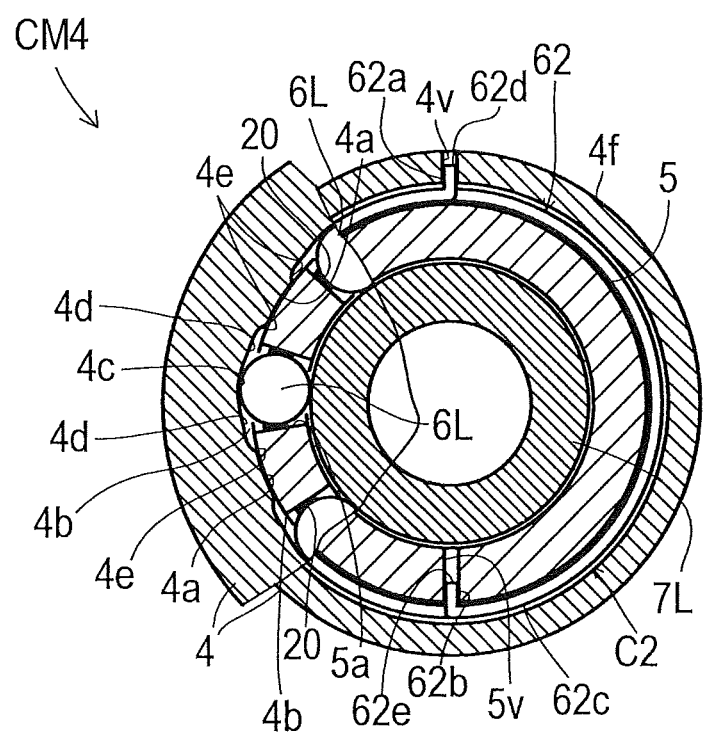
FIG. 19 is a cross sectional view taken along X-X line of FIG. 18 showing clutch-off biasing mechanism CM4, partly illustrating bi-directional overrunning clutch CL as a fragmentary cross sectional view taken along Y-Y line of FIG. 18.

In this regard, in FIGS. 18 and 19, cage 5 is illustrated as consisting of a single member extended in the whole axial range between the right and left ends thereof to carry right and left rollers 6. Further, in FIG. 18, this single member serving as cage 5 is illustrated as being formed at the right end portion thereof with grooves 5b into which engagement pawls 26a of rotary-side friction plate 26 in friction mechanism FM. However, in FIGS. 18 and 19, the illustration of cage 5 is simplified. Cage 5 shown in FIGS. 18 and 19 may actually include main part 5p and right and left end rings attached to the right and left end of main part 5p, the right end ring being formed with grooves 5b, and the left end ring serving as the left end portion of cage 5nd ring 5q such as shown in FIG. 5 may serve as the right end ring formed with grooves 5b. The same thing is adapted to illustration of later-discussed cages 5 shown in FIGS. 20 to 25.

To constitute clutch-off biasing mechanism CM4, cage 5 has a left end surface close to the right end of bearing 34L. Also, left end portion 4f of clutch housing 4 is further extended in space Sc leftward from bearing 33L so as to have left end surface 4ft coinciding to the left end of cage 5 in location in the axil direction of clutch housing 4 and cage 5.

Left end portion 4f of clutch housing 4 is radially thinned so as to have an inner circumferential surface having a lager inner diameter than the minimum inner diameter of clutch housing 4. Therefore, an annular gap space C2 is provided between the inner circumferential surface of left end portion 4f of clutch housing 4 and an outer circumferential surface of a left end portion of cage 5, so that a coiled portion 62c of torsion spring 62 is wound around the outer circumferential surface of the left end portion of cage 5 in gap space C2, in comparison with clutch-off biasing mechanism CM2, in which coiled portion 61c of torsion spring 61 is wound around left hub 7L in gap space C1 between the outer circumferential surface of left hub 7L and the inner circumferential surface of the left end portion of cage 5A.

A wire made of elastic material such as steel is formed so as to serve as torsion spring 62 including coiled portion 62c and outer and inner end portions 62a and 62b. Torsion spring 62 is interposed between cage 5 and clutch housing 4 without any additional member for guiding torsion spring 62.

Torsion spring 62 is bent at one of proximal and distal (right and left) end portions (in this embodiment, a proximal right end portion) of coiled portion 62c wound around the left end portion of cage 5 so as to form outer end portion 62a extended radially outward from coiled portion 62c. Also, torsion spring 62 is bent at the other of proximal and distal (right and left) end portions (in this embodiment, a distal left portion) of coiled portion 62c wound around the left end portion of cage 5 so as to form inner end portion 62b extended radially inward from coiled portion 62c.

Left end portion 4f of clutch housing 4 is notched by a groove 4v open distally leftward at left end surface 4ft.

Groove 4v is open radially inward at the inner circumferential surface of left end portion 4f so as to receive outer end portion 62a of torsion spring 62 from the outer circumferential surface of cage 5.

At the outer circumferential surface of left end portion 4f of clutch housing 4 surrounded by bearing 33L, groove 4v is open radially outward, however, an utmost end 62d of outer end portion 62a is disposed in groove 4v so as to be prevented from interfering with bearing 33L. Alternatively, groove 4v may be closed at the outer circumferential surface of left end portion 4f of clutch housing 4.

Groove 4v is narrow in the circumferential direction of clutch housing 4 so as to have a circumferential width that is substantially equal to a diameter of the wire serving as torsion spring 62. Therefore, outer end portion 62a of torsion spring 62 is fitted in groove 4v so as to be rotatably integral with clutch housing 4 in the circumferential direction of clutch housing 4.

The left end portion of cage 5 is notched by a groove 5v open distally leftward at the left end surface of cage 5. Groove 5v is open radially outward at the outer circumferential surface of the left end portion of cage 5 so as to receive inner end portion 62b of torsion spring 62 from the outer circumferential surface of cage 5.

At the inner circumferential surface of cage 5 facing the outer circumferential surface of left hub 7L, groove 5v is open radially inward, however, an utmost end 62e of inner end portion 62b is disposed in groove 5v so as to be prevented from interfering with left hub 7L. Alternatively, groove 5v may be closed at the inner circumferential surface of the left end portion of cage 5.

Groove 5v is narrow in the circumferential direction of cage 5 so as to have a circumferential width that is substantially equal to the diameter of the wire serving as torsion spring 62. Therefore, inner end portion 62b of torsion spring 62 is fitted in groove 5v rotatably integrally with cage 5 in the circumferential direction of cage 5.

Regarding relative location of grooves 4v and 5v in the circumferential direction of clutch housing 4 and cage 5, a center angle between grooves 4v and 5v at the axis of clutch housing 4 and cage 5 is optionally determined to correspond to a center angle between outer and inner end portions 62a and 62b at the axis of coiled portion 62c of torsion spring 62 in its initial state. In this embodiment, the center angle between outer and inner end portions 62a and 62b of torsion spring 62 in the initial state is 180 degrees, so that the center angle between grooves 4v and 5v is set as being 180 degrees when cage 5 is disposed at the initial position relative to clutch housing 4.

As cage 5 rotates relative to clutch housing 4 from the initial position relative to clutch housing 4, inner end portion 62b of torsion spring 62 fitted in groove 5v rotates together with cage 5 relative to clutch housing 4 retaining outer end portion 62a of torsion spring 62 fitted in groove 4v, so that coiled portion 62c of torsion spring 62 is elastically transformed to generate a spring force to restore torsion spring 62 to its initial state, thereby biasing cage 5 to the initial position relative to clutch housing 4 against the torque for rotation of cage 5 relative to clutch housing 4.

As mentioned above, in auxiliary transaxle 1C, friction mechanism FM and clutch-off biasing mechanism CM4 are distributed in transaxle casing 2 so that friction mechanism FM is disposed at one (in this embodiment, right) end portion of cage 5, and clutch-off biasing mechanism CM4 is disposed at the other (in this embodiment, left) end portion of cage 5.

In clutch-off biasing mechanism CM4, outer end portion 62a of spring 62 is engaged to clutch housing 4 so as to be rotatable integrally with clutch housing 4, and inner end portion 62b of spring 62 is engaged to cage 5 so as to be rotatable integrally with cage 5. Elastic coiled portion 62c of spring 62 between outer and inner end portions 62a and 62b is disposed in gap space C1 between cage 5 and clutch housing 4 so as to be allowed to elastically transform according to the rotation of cage 5 relative to clutch housing 4.

Therefore, auxiliary transaxle 1C including clutch-off biasing mechanism CM4 brings an effect similar to those of auxiliary transaxles 1, 1A and 1B.

Figure 20:
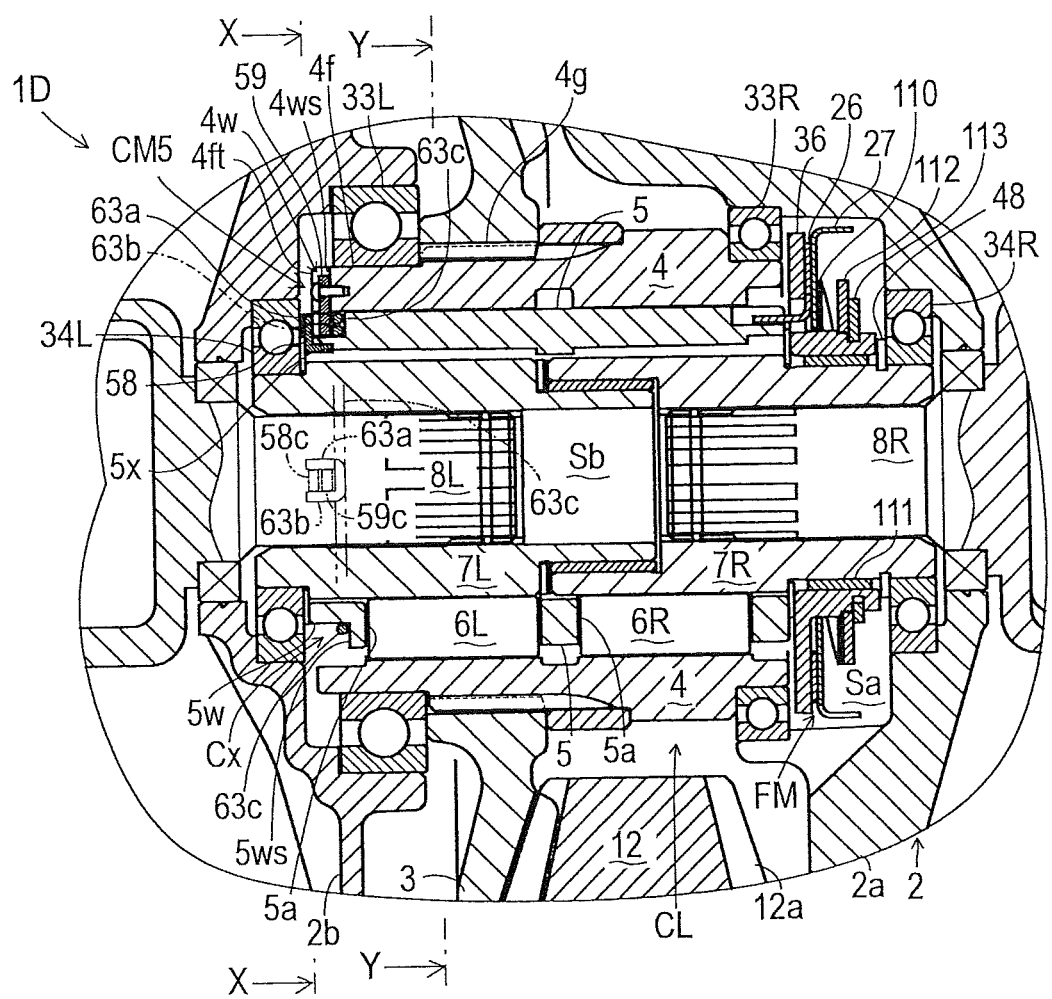
FIG. 20 is a fragmentary sectional plan view of a transaxle according to a fifth embodiment, incorporating bi-directional overrunning clutch CL, friction mechanism FM, and a clutch-off biasing mechanism CM5.

An auxiliary transaxle 1D will now be described with reference to FIGS. 20 and 21.

Auxiliary transaxle 1D includes a clutch-off biasing mechanism CM5 disposed opposite friction mechanism FM with respect to bi-directional overrunning clutch CL. Clutch-off biasing mechanism CM5 includes clutch housing 4, cage 5, left hub 7L and a torsion spring 63.

To constitute clutch-off biasing mechanism CM5, a left end surface of cage 5 is disposed close to the right end of bearing 34L. On the other hand, left end portion 4f of clutch housing 4 projects leftward from bearing 33L, however, left end surface 4ft is disposed rightward from the left end surface of clutch housing 4, i.e., in an axially intermediate portion of space Sc between bearings 33L and 34L.

An annular vertical surface 4ws is formed on the outer circumferential portion of cage 5 surrounded by bearing 33L. A left end portion of cage 5 extended leftward from vertical surface 5ws to the left end surface of cage 5 is formed as a radially thinned left end portion 5w whose outer circumferential surface is radially inward from that of the remaining part of cage 5 so as to have an outer diameter that is smaller than the maximum outer diameter of the remaining part of cage 5. An annular gap space Cx is provided between the outer circumferential surface of radially thinned left end portion 5w of groove 5E and the inner circumferential surface of left end portion 4f of clutch housing 4.

Left end portion 4f of clutch housing 4 is notched by a groove 4w open at left end surface 4ft and having a certain width along the circumferential direction of clutch housing 4. A spring-retainer 59 is fitted in groove 4w. Spring-retainer 59 contacts a vertical surface 4ws at the deepest end of groove 4w and is fastened to clutch housing 4 by a screw or a bolt. In this regard, vertical surface 5ws defining the right end of radially-thinned left end portion 5w of cage 5 is disposed proximally rightward from vertical surface 4ws defining the deepest right end of groove 4ws.

A radially inward end of groove 4w is open radially inward at the inner circumferential surface of left end portion 4f of clutch housing 4. Spring-retainer 59 includes a housing pin 59c projecting radially inward into gap space Cx via the radially inward open end of groove 4w toward the outer circumferential surface of radially thinned left end portion 5w of cage 5.

Radially thinned left end portion 5w of cage 5 is formed with a recessed groove 5c extended from the left end surface of cage 5 to the inner circumferential surface of radially thinner left end portion 5w of cage 5. A spring-retainer 58 is fitted in recessed groove 5x, and is fixed to cage 5. Spring-retainer 58 includes a cage pin 58c that projects radially outward into gap space Cx toward the inner circumferential surface of left end portion 4f of clutch housing 4 via a radially extended portion of recessed groove 5x along the left end surface of cage 5. Therefore, in gap space Cx, cage pin 58c is disposed distally leftward from housing pin 59c.

Spring-retainers 58 and 59 are made of material, such as metal, having rigidity required to elastically transform torsion spring 63 against a spring force of torsion spring 63.

Torsion spring 63 includes a coiled portion 63c and two end portions 63a and 63b. Coiled portion 63c of torsion spring 63 is radially duplex-wound around the outer circumferential surface of radially-thinned left end portion 5w of cage 5 between housing pin 59c and vertical surface 5ws of cage 5. The radially outward and inward end portions of coiled portion 63c are bent to extend leftward in the axial direction of cage 5 so as to be formed as radially outward end portion 63a and radially inward end portion 63b. Axially extended end portions 63a and 63b are pulled to cross over each other so as to compress coiled portion 63c radially inward, and are disposed opposite each other in the circumferential direction of cage 5 with respect to cage pin 58c and housing pin 59c.

Figure 21:
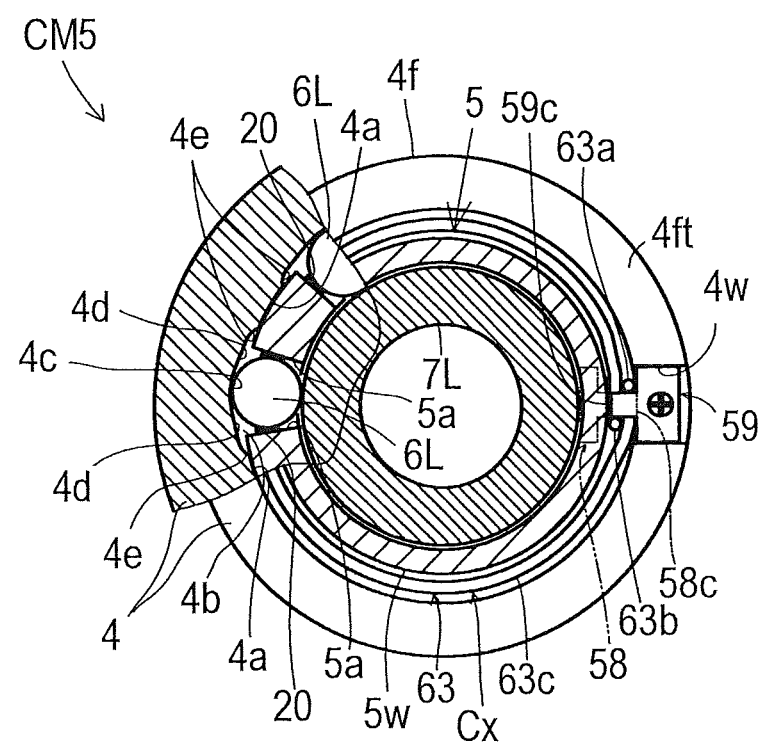
FIG. 21 is a cross sectional view taken along Y-Y line of FIG. 20 showing clutch-off biasing mechanism CM5, partly illustrating bi-directional overrunning clutch CL as a fragmentary cross sectional view taken along X-X line of FIG. 20.

When cage 5 is disposed at the initial position relative to clutch housing 4, each of end portions 63a and 63b of torsion spring 63 is pressed against both cage pin 58c and housing pin 59c so as to keep cage pin 58c and housing pin 59c overlapping each other on a radial line when viewed in the axial direction of cage 5 as shown in FIG. 21.

As cage 5 rotates relative to clutch housing 4 from the initial position relative to clutch housing 4, cage pin 58c rotates together with cage 5 relative to housing pin 59c fixed to clutch housing 4 so that one of end portions 63a and 63b of torsion spring 63 is pushed by cage pin 58c and is separated from housing pin 59c while the other of end portions 63a and 63b of torsion spring 63 is retained by housing pin 59c and is separated from cage pin 58c, thereby expanding a circumferential gap between end portions 63a and 63d of torsion spring 63, and thereby elastically transforming coiled portion 63c of torsion spring 63 so as to bias cage 5 to the initial position relative to clutch housing 4 against the torque for rotation of cage 5 relative to clutch housing 4. Which of end portions 63a and 63b of torsion spring 63 is pushed by cage pin 58c depends on whether cage 5 rotates clockwise or counterclockwise relative to clutch housing 4, i.e., whether the rotation direction of clutch housing 4 drivingly connected to input shaft 12 via bevel ring gear 3 is normal or reverse.

As mentioned above, in auxiliary transaxle 1D, friction mechanism FM and clutch-off biasing mechanism CM5 are distributed so that friction mechanism FM is disposed at one (in this embodiment, right) end portion of cage 5, and clutch-off biasing mechanism CM5 is disposed at the other (in this embodiment, left) end portion of cage 5.

In clutch-off biasing mechanism CM5, clutch housing 4 serving as the input member is provided with housing pin 59c that is rotatable integrally with clutch housing 4. Cage 5 is provided with cage pin 58c that is rotatable integrally with cage 5. End portions 63a and 63b of torsion spring 63 are pulled to cross over each other and have both housing pin 59c and cage pin 58c therebetween. When cage 5 is disposed at the initial rotational position relative to clutch housing 4 to disengage bi-directional overrunning clutch CL, housing pin 59c and cage pin 58c are disposed on one radial line and overlap each other, when viewed in the axial direction of clutch housing 4 and cage 5, so as to engage to both of end portions 63a and 63b of torsion spring 63 respectively. During rotation of cage relative to clutch housing 4 from the initial rotational position until bi-directional overrunning clutch CL is engaged, housing pin 59c and cage pin 58c are offset from each other in the circumferential direction of clutch housing 4 and cage 5 so that housing pin 59c engages to one of arm portions 63a and 63b of torsion spring 63, and cage pin 58c engages to the other of arm portions 63a and 63b of torsion spring 63.

Therefore, auxiliary transaxle 1D including clutch-off biasing mechanism CM5 brings an effect similar to that of auxiliary transaxles 1, 1A, 1B and 1C.

Figure 22:
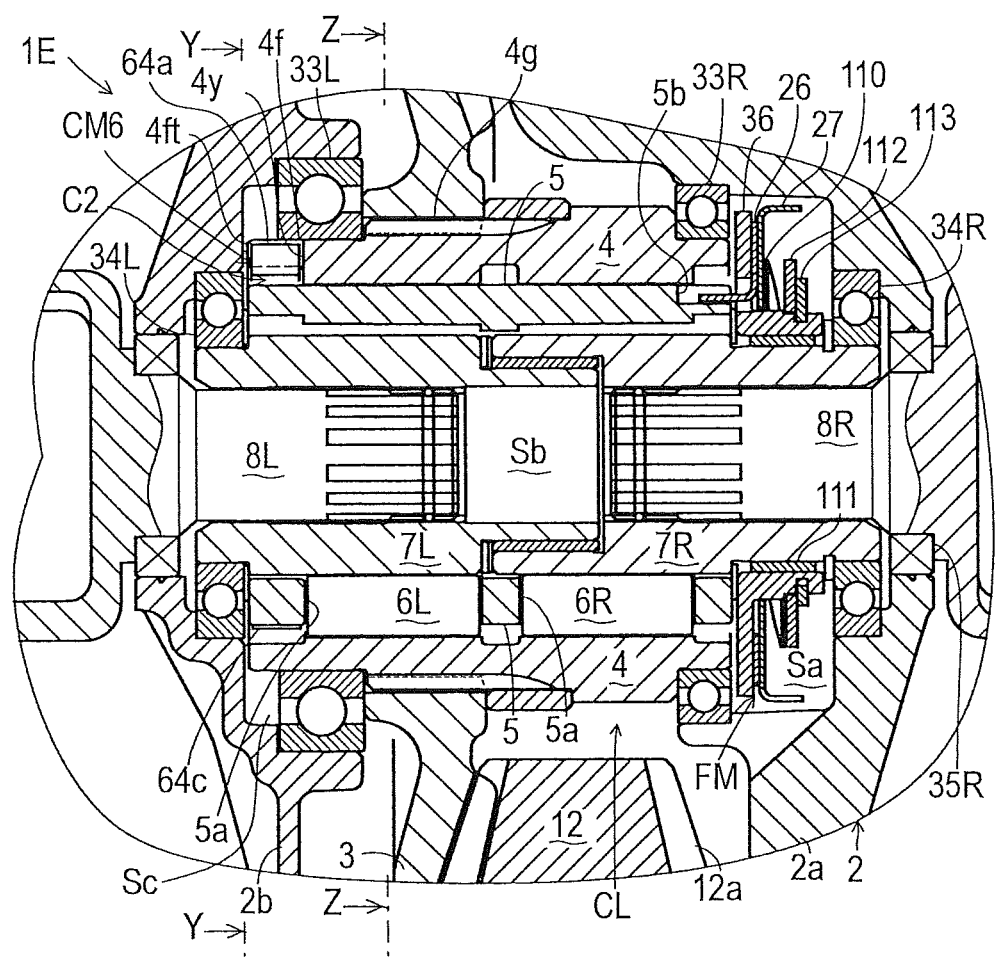
FIG. 22 is a fragmentary sectional plan view of a transaxle according to a sixth embodiment, incorporating bi-directional overrunning clutch CL, friction mechanism FM, and a clutch-off biasing mechanism CM6.
Figure 23:
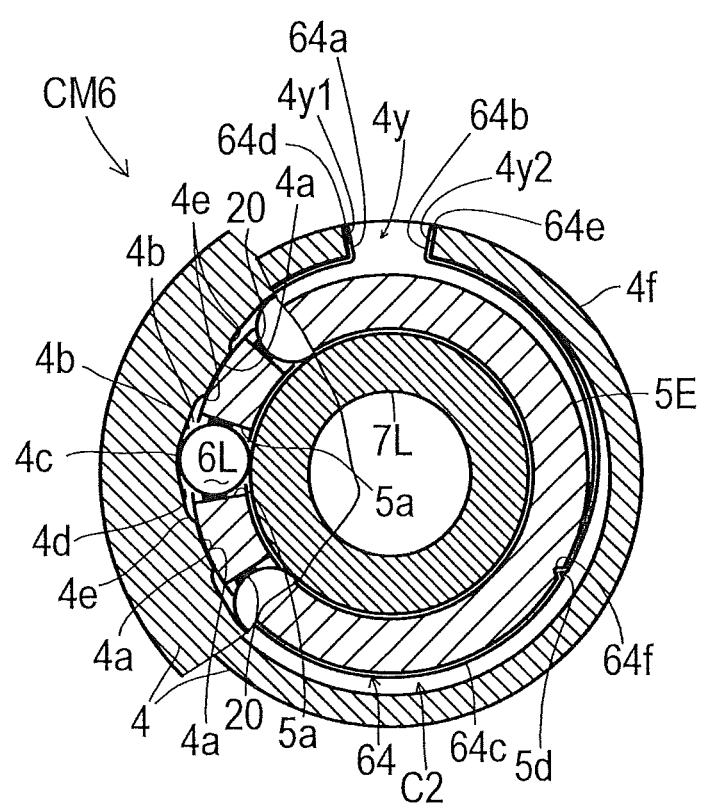
FIG. 23 is a cross sectional view taken along Y-Y line of FIG. 22 showing clutch-off biasing mechanism CM6, partly illustrating bi-directional overrunning clutch CL as a fragmentary cross sectional view taken along X-X line of FIG. 22.

An auxiliary transaxle 1E will now be described with reference to FIGS. 22 and 23.

Auxiliary transaxle 1E includes a clutch-off biasing mechanism CM6 disposed opposite friction mechanism FM with respect to bi-directional overrunning clutch CL. Clutch-off biasing mechanism CM6 includes clutch housing 4, cage 5, left hub 7L and a flat spring 64.

A long-and-narrow plate made of elastic material, such as steel, is formed as flat spring 64 including a circularly looped plate portion 64c and two end plate portions 64a and 64b. Opposite end portions of looped plate portion 64c are bent to extend radially outward from looped plate portion 64c so as to be formed as end plate portions 64a and 64b. In an initial state of flat spring 64 placed free from cage 5 and clutch housing 4, end plate portions 64a and 64b have a gap in the circumferential direction of looped plate portion 64c.

Left end portion 4f of clutch housing 4 is notched with a groove 4y having a certain width along the circumferential direction. In this regard, left end portion 4f of clutch housing 4 is formed with radially extended end surfaces 4y1 and 4y2 defining groove 4y therebetween. Groove 4y is open leftward at left end surface 4ft of clutch housing 4, and is open radially inward at the inner circumferential surface of left end portion 4f of clutch housing 4. The circumferential width of groove 4y between end surfaces 4y1 and 4y2 is slightly smaller than the initial circumferential gap between end plate portions 64a and 64b of flat spring 64 placed free from cage 5 and clutch housing 4.

The left end portion of cage 5 is extended leftward from bearing 33L so as to have the left end surface of cage 5 close to the right end of bearing 34L, and is formed on an outer circumferential surface thereof with two V-shaped grooves 5d extended in the axial direction so as to have a length that is not less than a width of the long-and-narrow plate serving as flat spring 64. Incidentally, only one of grooves 5d is shown in FIG. 21. In correspondence to respective grooves 5d, looped plate portion 64c is bent in V-shape at two circumferentially intermediate portions so as to form radially inwardly projecting projections 64f. In the circumferential direction of looped plate portion 64c, one projection 64f is closer to end plate portion 64a, and the other projection 64f is closer to end plate portion 64a.

Projections 64f of flat spring 64 are fitted into respective grooves 5d. Therefore, a portion of looped plate portion 64c between projections 64f is fitted on the outer circumferential surface of cage 5. In this state, end plate portions 64a and 64b are fitted into groove 4y so that end plate portion 64a is pressed against end surface 4y1, and end plate portion 64b is pressed against end surface 4y2. Therefore, in space C2 between the outer circumferential surface of the left end portion of cage 5 and the inner circumferential surface of left end portion 4f of clutch housing 4, a portion of looped plate portion 64c between one projection 64f and end plate portion 64a is extended between one groove 5d on the outer circumferential surface of cage 5 and a radially inward end of end surface 4y1 of clutch housing 4, and another portion of looped plate portion 64c between the other projection 64f and end plate portion 64b is extended between the other groove 5d on the outer circumferential surface of cage 5 and a radially inward end of end surface 4y2 of clutch housing 4.

While groove 4*y* is open radially outward at the outer circumferential surface of left end portion 4*f* of clutch housing 4, end plate portions 64*a* and 64*b* in groove 4*y* have respective utmost ends 64*d* and 64*e* that do not project radially outward from the outer circumferential surface of left end portion 4*f* of clutch housing 4, thereby being prevented from interfering with bearing 33L. Alternatively, groove 4*y* may be closed at the outer circumferential surface of left end portion 4*f* of clutch housing 4.

When cage 5 is disposed at the initial position relative to clutch housing 4, two projections 64*f* are kept to be fitted in respective grooves 5*d* so as to keep the portion of looped plate portion 64*c* between projections 64*f* fitted on the outer circumferential surface of cage 5. Since the circumferential width of groove 4*y* between end surfaces 4*y*1 and 4*y*2 is slightly smaller than the initial gap of flat spring 64 between end plate portions 64*a* and 64*b*, end plate portions 64*a* and 64*b* fitted in groove 4*y* are slightly narrowed in the gap therebetween so as to be pressed in opposite directions away from each other against respective end surfaces 4*y*1 and 4*y*2, so that plate spring 64 has a slight spring force in the direction to expand the gap between end plate portions 64*a* and 64*b*. The portions of looped plate portion 64*c* extended in space C2 are slightly bent so as to have elasticity such as to correspond to rotation of cage 5 relative to clutch housing 4 regardless of whether cage 5 rotates clockwise or counterclockwise relative clutch housing 4.

As cage 5 rotates relative to clutch housing 4 from the initial position, one groove 5*d* of cage 5 circumferentially moves away from corresponding end surface 4*y*1 or 4*y*2 of clutch housing 4, while the other groove 5*d* of cage 5 circumferentially approaches corresponding end surface 4*y*1 or 4*y*2. Therefore, in space C2, one of the portions of looped plate portion 64*c* extended between cage 5 and clutch housing 4 is tensioned, and the other of portions of looped plate portion 64*c* extended between cage 5 and clutch housing 4 is bent, so that looped plate portion 64*c* of flat spring 64 is elastically transformed to bias cage 5 to the initial position relative to clutch housing 4.

As mentioned above, in auxiliary transaxle 1E, friction mechanism FM and clutch-off biasing mechanism CM6 are distributed so that friction mechanism FM is disposed at one (in this embodiment, right) end portion of cage 5, and clutch-off biasing mechanism CM6 is disposed at the other (in this embodiment, left) end portion of cage 5.

In clutch-off biasing mechanism CM6, end plate portions 64*a* and 64*b* of flat spring 64 are engaged to clutch housing 4 rotatably integrally with clutch housing 4 so as to have a constant gap therebetween. Looped portion 64*c* between projections 64*d* serving as an intermediate portion of flat spring 64 is engaged to cage 5 rotatably integrally with cage 5. Flat spring 64 includes the pair of elastic portions of looped portion 64*c* between respective end plate portions 64*b* and respective projections 64*d* defining the portion of looped portion 64*c* serving as the intermediate portion of flat spring 64, such that the elastic portions of flat spring 64 are disposed in space C2 between cage 5 and clutch housing 4 so as to be allowed to elastically transform according to the rotation of cage 5 relative to clutch housing 4.

Therefore, auxiliary transaxle 1E including clutch-off biasing mechanism CM6 brings an effect similar to those of auxiliary transaxles 1, 1A, 1B, 1C and 1D.

An auxiliary transaxle 1F will now be described with reference to FIGS. 24 and 25.

Auxiliary transaxle 1F includes a clutch-off biasing mechanism CM7 disposed together with friction mechanism FM rightward from bi-directional overrunning clutch CL.

More specifically, clutch-off biasing mechanism CM7 is disposed between the right end portion of bi-directional overrunning clutch CL and friction mechanism FM. Clutch-off biasing mechanism CM7 includes clutch housing 4, cage 5, right hub 7R, friction mechanism FM, and a torsion spring 65.

In auxiliary transaxle 1F, spacer 36 of friction mechanism FM includes a cylindrical spring cover 36*h* disposed opposite horizontal sleeve portion 36*a* with respect to vertical disc portion 36*b*. Outer and inner diameters of spring cover 36*h* are greater than the outer diameter of horizontal sleeve portion 36*a*. In friction mechanism FM assembled in axle casing 2, a space Sd is formed between vertical disc portion 36*b* and a right end surface 4*ht* of clutch housing 4. Space Sd is surrounded by vertical dis portion 36*b*, spring cover 36*h*, right end surface 4*ht* of clutch housing 4 and the outer circumferential surface of cage 5.

A position of a right end surface 5*ht* of cage 5 relative to right end 4*ht* of clutch housing 4 in the present embodiment is different from the position of the right end of cage 5 relative to the right end of clutch housing 4 in the foresaid embodiments. More specifically, in the present embodiment, right end surface 5*ht* of cage 5 is disposed rightward from right end surface 4*ht* of clutch housing 4. A rightward projection degree of right end surface 5*ht* of cage 5 from right end surface 4*ht* of clutch housing 4 substantially coincides to a leftward projection degree of spring cover 36*h* from vertical discoid portion 36*b*.

Two housing pins Pn1 and Pn2 are fixed to (or formed on) clutch housing 4 so as to project axially distally rightward from right end surface 4*ht* of clutch housing 4. Spring cover 36*h* of spacer 36 is located radially outward from housing pins Pn1 and Pn2.

A wire made elastic material such as steel is formed as torsion spring 65 including a coiled portion 65*c* and two end portions 65*a* and 65*b*. Referring to FIG. 24, coiled portion 65*c* is wound along an inner circumferential surface of spring cover 36*h* of spacer 36 so as to proximal and distal (left and right) end portions. The proximal and distal end portions of coiled portion 65*c* are pulled to cross over each other and are bent to extend radially inward from coiled portion 65*c* so as to be formed as proximal (left) end portion 65*a* and distal (right) end portion 65*b* of torsion spring 65.

Any pair of adjoining engagement pawls 26*a* are selected from all engagement pawls 26*a* so as to serve as engagement pawls 26*a*1 and 26*a*2 disposed between end portions 65*a* and 65*b* of torsion spring 65. The axially extended portion of each of engagement pawls 26*a*1 and 26*a*2 fitted in respective grooves 5*b* has circumferentially opposite end edges. One of the end edges of engagement pawl 26*a*1 is more distant from engagement pawl 26*a*2 than the other of the end edges of engagement pawl 26*a*1, and is referred to as an end edge 26*x* of engagement pawl 26*a*1. The other of the end edges of engagement pawl 26*a*2 is more distant from engagement pawl 26*a*1 than the other of the end edges of engagement pawl 26*a*2, and is referred to as an end edge 26*y* of engagement pawl 26*a*2. The circumferential interval between housing pins Pn1 and Pn2 is set to correspond to a circumferential interval between end edge 26*x* of engagement pawl 26*a*1 and end edge 26*y* of engagement pawl 26*a*2.

Housing pins Pn1 and Pn2 and engagement pawls 26*a*1 and 26*a*2 are disposed between end portions 65*a* and 65*b* of torsion spring 65. When cage 5 is disposed at the initial position relative to clutch housing 4, one of proximal and distal end portions 65*a* and 65*b* (in this embodiment, proximal (left) end portion 65*a*) is hung at a radially outward end portion thereof on housing pin Pn1 and is pressed at a radially inward end portion thereof against end edge 26x of engagement pawl 26a1, and the other of proximal and distal end portions 65a and 65b (in this embodiment, distal (right) end portion 65b) is hung at a radially outward end portion thereof on housing pin Pn2 and is pressed at a radially inward end portion thereof against end edge 26y of engagement pawl 26a2.

As cage 5 rotates relative to clutch housing 4 from the neutral position, engagement pawls 26a1 and 26a2 rotate together with cage 5 to move circumferentially relative to housing pins Pn1 and Pn2 fixed to (or formed on) clutch housing 4. Referring to FIG. 25, if cage 5 rotates clockwise relative to clutch housing 4, end portion 65b of torsion spring 65 is pushed by end edge 26y of engagement pawl 26a2 and is separated from housing pin Pn2, while end portion 65a of torsion spring 65 is retained by housing pin Pn1 and is separated from end edge 26x of engagement pawl 26a1. If cage 5 rotates counterclockwise relative to clutch housing 4, end portion 65a of torsion spring 65 is pushed by end edge 26x of engagement pawl 26a1 and is separated from housing pin Pn1, while end portion 65b of torsion spring 65 is retained by housing pin Pn2 and is separated from end edge 26y of engagement pawl 26a2. Therefore, the circumferential gap between end portions 65a and 65b of torsion spring 65 is expanded to elastically transform coiled portion 65c of torsion spring 65 so as to bias cage 5 to the initial position relative to clutch housing 4, regardless of whether cage 5 rotates clockwise or counterclockwise relative to clutch housing 4.

Alternatively, only one engagement pawl 26a or more than two engagement pawls 26a may be disposed between end portions 65a and 65b of torsion spring 65. In such an alternative case, clutch housing 4 is provided with housing pins Pn1 and Pn2 having an alternative interval therebetween, and end portions 65a and 65b of torsion spring 65 has an alternative gap therebetween, in correspondence to the number of engagement pawls 26a placed between end portions 65a and 65b of torsion spring 65.

It is further understood by those skilled in the art that the foregoing description is a preferred embodiment of the disclosed device and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaxle comprising:
    a transaxle casing;
    a bi-directional overrunning clutch disposed in the transaxle casing, the bi-directional overrunning clutch comprising:
        an input member journalled by the transaxle casing,
        an output member journalled by the transaxle casing and coaxially surrounded by the input member,
        wherein the input member and the output member have an annular space between an inner circumferential surface of the input member and an outer circumferential surface of the output member, and
        wherein the inner circumferential surface of the input member comprises a plurality of wedge portions aligned in the circumferential direction of the input member, and includes a plurality of radially expanded portions which are diametrically larger than the wedge portions,
        a cylindrical cage disposed coaxially to the input member and the output member in the annular space, the cage having first and second end portions opposite each other in the axial direction of the output member, and
        a plurality of rollers carried by the cage and contacting the outer circumferential surface of the output member rotatably following rotation of the output member,
        wherein the bi-directional overrunning clutch is structured so as to automatically shift between its disengagement state where the rollers are disposed at the respective radially expanded portions of the input member and are separated from the respective wedge portions, and its engagement state where the rollers contact the respective wedge portions, the shift of the bi-directional overrunning clutch depending on change of rotary speed difference between the input member and the output member;
    a friction mechanism structured to apply a frictional force to the cage so as to enable the cage to rotate relative to the input member according to the rotation of the rollers following the output member; and
    a clutch-off biasing mechanism structured to bias the cage in a direction to disengage the bi-directional overrunning clutch,
    wherein the friction mechanism and the clutch-off biasing mechanism are distributively disposed in the transaxle casing so that the friction mechanism is disposed at the first end portion of the cage, and the clutch-off biasing mechanism is disposed at the second end portion of the cage,
    wherein the clutch-off biasing mechanism comprises:
        a spring interposed between the input member and the cage so as to be elastically transformable according to the rotation of the cage relative to the input member, the spring including an elastic looped portion, first and second end portions extending radially inward from the elastic looped portion and third and fourth end portions respectively extending from the first and second end portions and tangentially away from each other,
    wherein the cage comprises a spring holder supporting the spring, and
    wherein the spring holder is engaged to the second end portion of the cage rotatably integrated with the cage, and is formed with a pair of pressure pawls having respective ends between which a gap is defined, extending along the axial direction and supporting the third and fourth end portions of the spring.

2. The transaxle according to claim 1,
    wherein the input member comprises first and second engagement members that are rotatable integrally with the input member,
    wherein the cage comprises third and fourth engagement members that are rotatable integrally with the cage,
    wherein the spring is a compression spring, and the first and second end portions of the spring are disposed between the first and second engagement members and between the third and fourth engagement members, wherein the transaxle is configured such that, when the cage is disposed at its initial rotational position relative to the input member to disengage the bi-directional overrunning clutch, the third and fourth engagement members are aligned with the respective first and second engagement members on respective radial lines, when viewed in the axial direction of the input member and the cage, so that the first end portion of the spring is engaged to the first and third engagement portions, and the second end portion of the spring is engaged to the second and fourth engagement portions, and wherein the transaxle is configured such that, during rotation of the cage relative to the input member from the initial rotational position until the bi-directional overrunning clutch is engaged, the third and fourth engagement members are offset from the first and second engagement members in the circumferential direction of the input member and the cage so that one of the first and second end potions of the spring is engaged to either the first or second engagement member, and the other of the first and second end portions of the spring is engaged to either the third or fourth engagement portion.

3. The transaxle according to claim 2, wherein the spring holder further supports the elastic looped portion of the spring between the first and second end portions of the spring.

* * * * *